(12) United States Patent
Yakut et al.

(10) Patent No.: US 11,860,617 B2
(45) Date of Patent: Jan. 2, 2024

(54) FORECASTING INDUSTRIAL AGING PROCESSES WITH MACHINE LEARNING METHODS

(71) Applicant: BASF SE, Ludwigshafen am Rhein (DE)

(72) Inventors: Nataliya Yakut, Ludwigshafen am Rhein (DE); Simeon Sauer, Heidelberg (DE); Mihail Bogojeski, Berlin (DE); Franziska Horn, Berlin (DE); Klaus-Robert Mueller, Berlin (DE)

(73) Assignee: Technische Universitaet Berlin, Berlin (DE)

( * ) Notice: Subject to any disclaimer, the term of this patent is extended or adjusted under 35 U.S.C. 154(b) by 0 days.

(21) Appl. No.: 17/779,737

(22) PCT Filed: Nov. 25, 2020

(86) PCT No.: PCT/EP2020/083425
§ 371 (c)(1),
(2) Date: May 25, 2022

(87) PCT Pub. No.: WO2021/105246
PCT Pub. Date: Jun. 3, 2021

(65) Prior Publication Data
US 2023/0028276 A1 Jan. 26, 2023

(30) Foreign Application Priority Data
Nov. 26, 2019 (EP) .................................. 19211393

(51) Int. Cl.
*G05B 23/02* (2006.01)
(52) U.S. Cl.
CPC ..... *G05B 23/0283* (2013.01); *G05B 23/0254* (2013.01)

(58) Field of Classification Search
CPC .............. G05B 11/06; G05B 19/41875; G05B 23/0216; G05B 23/0218; G05B 23/0245;
(Continued)

(56) References Cited

U.S. PATENT DOCUMENTS

| 2014/0163746 A1 | 6/2014 | Drew et al. |
| 2015/0025689 A1* | 1/2015 | Saravanapriyan ........ G01L 3/10 700/275 |

(Continued)

FOREIGN PATENT DOCUMENTS

WO     2013127958 A1     9/2013

OTHER PUBLICATIONS

International Preliminary Report on Patentability for PCT/EP2020/083425 dated Mar. 3, 2022, 7 pages.
(Continued)

*Primary Examiner* — Mohammad K Islam
(74) *Attorney, Agent, or Firm* — Lowenstein Sandler LLP

(57) ABSTRACT

By accurately predicting industrial aging processes (IAP), such as the slow deactivation of a catalyst in a chemical plant, it is possible to schedule maintenance events further in advance, thereby ensuring a cost-efficient and reliable operation of the plant. So far, these degradation processes were usually described by mechanistic models or simple empirical prediction models. In order to accurately predict IAP, data-driven models are proposed, comparing some traditional stateless models (linear and kernel ridge regression, as well as feed-forward neural networks) to more complex stateful recurrent neural networks (echo state networks and long short-term memory networks). Additionally, variations of the stateful models are discussed. In particular, stateful models using mechanistical pre-knowledge about the degradation dynamics (hybrid models). Stateful models and their variations may be more suitable for generating near (Continued)

perfect predictions when they are trained on a large enough dataset, while hybrid models may be more suitable for generalizing better given smaller datasets with changing conditions.

17 Claims, 18 Drawing Sheets

(58) Field of Classification Search
CPC ............ G05B 23/0254; G05B 23/0283; G06Q 10/06393; G06Q 10/06395; G06Q 10/067
See application file for complete search history.

(56) References Cited

U.S. PATENT DOCUMENTS

| | | | |
|---|---|---|---|
| 2018/0024901 A1* | 1/2018 | Tankersley | G06Q 10/06393 707/694 |
| 2018/0032940 A1* | 2/2018 | Trenchard | G06Q 10/067 |
| 2018/0348717 A1 | 12/2018 | Zhao et al. | |
| 2019/0179271 A1 | 6/2019 | Modi et al. | |
| 2019/0188584 A1 | 6/2019 | Rao et al. | |
| 2020/0210947 A1* | 7/2020 | Devarakonda | G06Q 10/087 |
| 2020/0272974 A1* | 8/2020 | Sato | G06Q 10/06393 |
| 2020/0380447 A1* | 12/2020 | Wang | H04L 67/12 |

OTHER PUBLICATIONS

International Search Report and Written Opinion for PCT/EP2020/083425 dated Jan. 18, 2021, 3 pages.
European Search Report for 19211393.4 dated May 7, 2020, 9 pages.
Giang Nguyen et al., Machine Learning and Deep Learning Frameworks and Libraries for Large-Scale Data Mining: A Survey; Artificial Intelligence Review; Jun. 2019, vol. 52, Issue 1, pp. 77-124.
Draper NR, Smith H. Applied Regression Analysis, vol. 326. John Wiley Sons; 2014, 8 pages.
Scholkopf B. et al. Learning with Kernels: Support Vector Machines, Regularization, Optimization, and Beyond, MIT press; 2001, 179 pages.
Jaeger H. The "Echo State" Approach to Analysing and Training Recurrent Neural Networks—With an Erratum Note Bonn, Germany: German National Research Center for Information Technology GMD Technical Report 2001;148(34):13, 47 pages.
Bishop CM, et al. Pattern Recognition and Machine Learning. Journal of Electronic Imaging 2007;16(4), 2 pages.

* cited by examiner

FORECASTING INDUSTRIAL AGING PROCESSES WITH MACHINE LEARNING METHODS

CROSS-REFERENCE TO RELATED APPLICATION SECTIONS

The present application is a national stage entry of International Application No. PCT/EP2020/083425, filed on Nov. 25, 2020, which claims priority to European Patent Application No. 19211393.4, filed on Nov. 26, 2019, the contents of which are hereby incorporated by reference in their entirety.

FIELD OF THE INVENTION

The present invention relates to a computer-implemented method and an apparatus for predicting a progress of degradation of a chemical production plant. The present invention further relates to a computer program element and a computer readable medium.

BACKGROUND OF THE INVENTION

Aging of critical assets is an omnipresent phenomenon in any production environment, causing significant maintenance expenditures or leading to production losses. The understanding and anticipation of the underlying degradation processes is therefore of great importance for a reliable and economic plant operation, both in discrete manufacturing and in the process industry.

With a focus on the chemical industry, notorious aging phenomena include the deactivation of heterogeneous catalysts due to coking, sintering, or poisoning; plugging of process equipment, such as heat exchangers or pipes, on process side due to coke layer formation or polymerization; fouling of heat exchangers on water side due to microbial or crystalline deposits; erosion of installed equipment, such as injection nozzles or pipes, in fluidized bed reactors; and more.

For virtually any important aging phenomenon in chemical engineering, the respective scientific community has developed a detailed understanding of their microscopic and macroscopic driving forces. This understanding has commonly been condensed into sophisticated mathematical models. Examples of such mechanistic degradation models deal with coking of steamcracker furnaces, sintering or coking of heterogeneous catalysts, or crystallization fouling of heat exchangers.

While these models give valuable insights into the dynamics of experimentally non-accessible quantities, and may help to verify or falsify hypotheses about the degradation mechanism in general, they may not be, or only with significant modeling effort, transferable to the specific environment in a real-world apparatus: Broadly speaking, these models may often describe 'clean' observations of the degradation process in a lab environment, and may not reflect the 'dirty' reality in production, where additional effects come into play that are hard or impossible to model mechanistically. To mention only ones example, sintering dynamics of supported metal catalysts are hard to model quantitatively even in the 'clean' system of Wulff-shaped particles on a flat surface—while in real heterogeneous catalysts, surface morphology and particle shape may deviate strongly from this assumption. Consequently, mechanistic models are rarely used in a production environment to forecast degradation dynamics of critical assets.

SUMMARY OF THE INVENTION

There may be a need to provide a reasonable prediction on the expected progression of an industrial aging process (IAP) of a chemical production plant.

The object of the present invention is solved by the subject-matter of the independent claims, wherein further embodiments are incorporated in the dependent claims. It should be noted that the following described aspects of the invention apply also for the computer implemented method, the apparatus, the computer program element, and the computer readable medium.

A first aspect of the present invention relates to a computer-implemented method for predicting a progress of degradation of a chemical production plant. The method comprises:
  a) receiving via an input channel currently measured process data indicative of a current process condition for a current operation of at least one chemical process equipment of the chemical production plant, wherein the at least one chemical process equipment has one or more degradation key performance indicators, KPIs, for quantifying the progress of degradation of the at least one chemical process equipment;
  b) receiving via the input channel one or more expected operating parameters indicative of a planned operating condition of the at least one chemical process equipment within a prediction horizon;
  c) applying by a processor a data driven model to an input dataset comprising the currently measured process data and the one or more expected operating parameters to estimate a future value of the one or more degradation KPIs within the prediction horizon, wherein the data driven model is parametrized or trained according to a training dataset, wherein the training dataset is based on sets of historical data comprising process data and the one or more degradation KPIs; and
  d) providing via an output channel the future value of the one or more degradation KPIs within the prediction horizon which is usable for monitoring and/or controlling.

In other words, a method is provided for predicting short-term and/or forecasting long-term degradation process of one or more equipment of a chemical production plant as a function of the current process condition and the planned operating condition of the chemical production plant. On shorter time scales, the selected parameters may exhibit fluctuations that are not driven by the degradation process itself, but rather by varying process conditions or background variables such as the ambient temperature. In other words, the one or more degradation KPIs are to a large extent determined by the process conditions, and not by uncontrolled, external factors, such as bursting of a flawed pipe. On a time scale longer than a typical production time scale, e.g., batch time for discontinuous processes or typical time between set point changes for continuous processes, the selected parameters change substantially monotonically to a higher or lower value, thereby indicating an occurrence of an irreversible degradation phenomenon.

In some examples the method may further comprise the step of comparing the future value of the one or more KPIs to a threshold and determine a time in the future at which the threshold is met. This time information may then either be provided via an output channel or used for predicting a maintenance event.

The method uses a data driven model, e.g., a data driven machine learning (ML) model, which does not involve a priori physico-chemical processes of the one or more chemical process equipment of the chemical production plant. The data driven model is able to use one or more key performance indicators (KPIs) to predict both the short-term and long-term degradation process of the chemical production plant as a function of input parameters, including one or more expected operating parameters indicative of a planned operating condition of the at least one chemical process equipment and process data derived from sensor available in the production plant. A software product for performing the method is also provided. As application examples, the method may be used to predict and forecast at least one of the following degradation processes in a chemical production plant: deactivation of heterogeneous catalysts due to coking, sintering, and/or poisoning; plugging of a chemical process equipment on process side due to coke layer formation and/or polymerization; fouling of a heat exchanger on water side due to microbial and/or crystalline deposits; and erosion of an installed equipment in a fluidized bed reactor.

The data driven model refers to a trained mathematical model that is parametrized according to a training dataset to reflect the dynamics of a real degradation process in a chemical production plant. In some examples, the data driven model may comprise a data driven machine learning model. As used herein, the term "machine learning" may refer to a statistical method that enables machines to "learn" tasks from data without explicitly programming. Machine learning techniques may comprise "traditional machine learning"—the workflow in which one manually selects features and then trains the model. Examples of traditional machine learning techniques may include decision trees, support vector machines, and ensemble methods. In some examples, the data driven model may comprises a data driven deep learning model. Deep learning is a subset of machine learning modeled loosely on the neural pathways of the human brain. Deep refers to the multiple layers between the input and output layers. In deep learning, the algorithm automatically learns what features are useful. Examples of deep learning techniques may include convolutional neural networks (CNNs), recurrent neural networks (such as long short-term memory, or LSTM), and deep Q networks. A general introduction into machine learning and corresponding software frameworks is described in "Machine Learning and Deep Learning frameworks and libraries for large-scale data mining: a survey"; Artificial Intelligence Review; Giang Nguyen et al., June 2019, Volume 52, Issue 1, pp 77-124. As will be explained hereafter and particularly with respect to the exemplary embodiments shown in FIGS. 5 to 9, the data driven model may comprise a stateful model, which is a machine learning model with a hidden state that is continuously updated with a new time step and contains information about an entire past of time series. Alternatively, the data driven model may comprise a stateless model, which is a machine learning model that bases its forecast only on the inputs within a fixed time window prior to the current operation. In other words, the stateless model also relies on past values of degradation KPI and operating parameters on the input side. Alternatively, the data driven model may comprises a hybrid model, i.e. a combination of a stateful model and a stateless model.

The at least one chemical process equipment may be one of the critical components of the chemical production plant, as the health state of the critical components has a strong influence on maintenance activities of the chemical production plant. The source of this information concerning the selection of critical components may be a bad actor analysis or general experience of operations. Examples of degradation processes for such chemical process equipment may include, but not limited to, deactivation of heterogeneous catalysts due to coking, sintering, and/or poisoning; plugging of a chemical process equipment on process side due to coke layer formation and/or polymerization; fouling of a heat exchanger on water side due to microbial and/or crystalline deposits; and erosion of an installed equipment in a fluidized bed reactor.

The at least one chemical process equipment may have one or more KPIs for quantifying the progress of its degradation. The one or more degradation KPIs may be selected from parameters comprising: a parameter contained in a set of measured process data and/or a derived parameter representing a function of one or more parameters contained in a set of the measured process data. In other words, the one or more degradation KPIs may comprise parameters that are measured directly using a sensor, e.g., a temperature sensor or a pressure sensor. The one or more degradation KPIs may alternatively or additionally comprise parameters that are obtained indirectly through proxy variables. For example, while catalyst activity is not measured directly in process data, it manifests itself in reduced yield and/or conversion of the process. The one or more degradation KPIs may be defined by a user (e.g. process operator) or by a statistical model e.g. an anomaly score measuring the distance to the "healthy" state of the equipment in a multivariate space of relevant process data, such as the Hotelling $T^2$ score or the D Mod X distance derived from principal component analysis (PCA). Here, the healthy state may refer to the bulk of states that are typically observed during periods in the historic process data that were labelled as "usual"/"unproblematic"/"good" by an expert for the production process.

The process data may refer to a quantity indicative of the operation status of the chemical production plant. For example, such quantities may relate to measurement data collected during the production run of the chemical production plant and may be directly or indirectly derived from such measurement data. For example, the process data may include sensor data measured through sensors installed in the chemical production plant, quantities directly or indirectly derived from such sensor data. Sensor data may include measured quantities available in chemical production plants by means of installed sensors, e.g., temperature sensors, pressure sensors, flow rate sensors, etc.

The set of process data may include raw data, which refers to basic, non-processed sensor data. Alternatively or additionally, the set of process data may include processed or derived parameters, which are directly or indirectly derived from raw data. For example, while catalyst activity is not measured directly in process data, it manifests itself in reduced yield and/or conversion of the process. Examples of derived data for the catalyst activity may include, but not limited to, averaged inlet temperature over multiple catalytic reactors derived from the respective temperature sensors, steam-to-oil ratio derived from the raw data of a steam flow rate and a reactant flow rate, and any type of normalized data, e.g., production values normalized by catalyst volume or catalyst mass.

In case of the current production run, the process data may include information about the current operating conditions, as reflected by the operating parameters set, e.g., feed rate into reactor, which may be chosen and/or controlled by a plant personnel. As used herein, the term "current" refers to the most recent measurement, as the measurement for certain equipment may not be carried out in real time.

The useful prediction horizon for degradation of an equipment may range between hours and months. The applied prediction horizon may be determined by two factors. Firstly, the forecast has to be accurate enough to be used as a basis for decision. To achieve accuracy, input data of future production planning has to be available, which is available only for limited prediction horizons. Furthermore, the prediction model itself may lack accuracy due to the underlying prediction model structure or due to poorly defined model parameters, which may be a consequence of the noisy and finite nature of the historical data set used for model identification. Secondly, the forecast horizon has to be long enough to address the relevant operational questions, such as taking maintenance actions, making planning decisions.

The planned operating condition may refer to an operating condition under which the chemical production plant may run in the future within the prediction horizon. The planned operating condition is reflected by one or more expected operating parameters, which may be known and/or controllable over the prediction horizon instead of uncontrolled, external factors. Examples of the uncontrolled, external factors may include catastrophic events, such as busting of a flawed pipe. Further examples of the uncontrolled, external factors may include a less catastrophic, but more frequent external disturbance, such as varying outside temperature, or varying raw material quality. In other words, the one or more expected operating parameters may be planned or anticipated over the prediction horizon.

With the one or more expected operating parameters, it may be used to simulate "what-if" scenarios as e.g. change of process conditions, such as reduced feed load, feed composition and reactor temperature over the prediction horizon. It is noted that the proposed data driven model does not extrapolate future operating states from past and/or current operating states, but rather requires a user input for the one or more expected operating parameters in order to account for changing operating condition of a plant in the future. The use of expected operating parameters may account for future changes in plant operation. Key performance indicator is a function of input parameters, including one or more expected operating parameters indicative of a planned operating condition of the at least one chemical process equipment and process data derived from sensor available in the production plant. By using the expected operating parameters, it is possible to include e.g. future load onto the system for the prediction. Allowing the value of the future operation parameters to vary based on planning in the plant may provide an additional degree of freedom, which may increase quality of the prediction model and may make the prediction more robust.

The input dataset for the data driven model may comprise current operating parameters. The current operating parameters may include raw data, which refers to basic, non-processed sensor data. For example, temperature and/or pressure in the reactor, feed rate into the reactor, which may be chosen and/or controlled by a plant personnel. Alternatively or additionally, the set of process data may include processed or derived parameters, which are directly or indirectly derived from raw data, e.g. steam-to-oil ratio derived from the raw data of a steam flow rate and a reactant flow rate, and any type of normalized data.

According to an embodiment of the present invention, the at least one chemical process equipment is operated in a cyclic manner including multiple runs. Each run includes one production phase followed by a regeneration phase. The input dataset comprises at least one process information from last run.

In other words, in case of cycling operation of the asset the input data set may further comprise at least one process information from last run. The last run may be the run preceding the "current run", in which the current operation is used. Exemplary process information from last run may include, but is not limited to, time on stream since last regeneration, time on stream since last exchange, process condition at end of last run, duration of regeneration of last run, and duration of last run. For forecasting purpose, the input dataset may include additionally the information about planned operating conditions for the prediction horizon.

According to an embodiment of the present invention, the one or more degradation KPIs are selected from parameters comprising: a parameter contained in a set of measured process data and/or a derived parameter representing a function of one or more parameters contained in a set of the measured process data.

According to an embodiment of the present invention, the selected parameters have at least one of the following characteristics: trending to a higher or lower value in a substantially monotonic fashion on a time scale longer than a typical production time scale, thereby indicating an occurrence of an irreversible degradation phenomenon, and returning to a baseline after a regeneration phase.

Regeneration phase is a very important specific part of the process because that may lead to the returning the KPI to its baseline after regeneration procedure even without exchange of the process equipment. The presence of the regeneration phase leads to the complex degradation behaviour. In this case the process equipment or catalyst may experience the degradation on a different time scales. We have a degradation behaviour within one cycle with the regeneration phase at the end of the cycle and at the same time we observe the degradation over the whole lifetime of the process equipment or a catalyst charge. This will be explained hereafter and in particular with respect to the example illustrated in FIG. 2.

The presence of the regeneration phase may have an impact on the definition of the input parameters of the data driven model. In this case, additional input parameters may be beneficial for improving the accuracy of the prediction.

Despite the large variety of affected asset types in a chemical production plant, and the completely different physical or chemical degradation processes that underlie them, the selected parameters representing the one or more degradation KPIs may have at least one of the following characteristics:

On a time scale longer than a typical production time scale, e.g., batch time for discontinuous processes or typical time between set point changes for continuous processes, the selected parameters change substantially monotonically to a higher or lower value, thereby indicating an occurrence of an irreversible degradation phenomenon. The term "monotonic", or "monotonically", means that the selected parameters representing the degradation KPIs either increase or decrease on a longer time sale, e.g., the time scale of the degradation cycle, and the fluctuations on a shorter time scale do not affect this trend. On shorter time scales, the selected parameters may exhibit fluctuations that are not driven by the degradation process itself, but rather by varying process conditions or background variables such as the ambient temperature. In other words, the one or more degradation KPIs are to a large extent determined by the process conditions, and not by uncontrolled, external factors, such as bursting of a flawed pipe, varying outside temperature, or varying raw material quality.

The selected parameters may return to their baseline after a regeneration phase. As used herein, the term "regeneration" may refer to any event/procedure that reverses the degradation, including exchange of process equipment or catalyst, cleaning of process equipment, in-situ re-activation of catalyst, burn-off of cokes layers, etc.

In an example, the degradation comprises at least one of: deactivation of heterogeneous catalysts due to coking, sintering, and/or poisoning; plugging of a chemical process equipment on process side due to coke layer formation and/or polymerization; fouling of a heat exchanger on water side due to microbial and/or crystalline deposits; and erosion of an installed equipment in a fluidized bed reactor.

According to an embodiment of the present invention, the data driven model comprises a stateful model, which is a machine learning model with a hidden state that is continuously updated with a new time step and contains information about an entire past of time series. Alternatively or additionally, the data driven model comprises a stateless model, which is a machine learning model that bases its forecast only on the inputs within a fixed time window prior to the current operation Stateless models are machine learning models that base their forecast only on the inputs within a fixed time window in the past. Examples of stateless models may include, but not limited to, linear ridge regression (LRR), kernel ridge regression (KRR), and feed/forward neural networks (FFNN). LRR is an ordinary linear regression model with an added regularization term that prevents the weights from taking on extreme values due to outliers in the training set. KRR is a non-linear regression model that can be derived from LRR using the so-called 'kernel trick'. Analogously to LRR, FFNNs learn a direct mapping between some input parameters and some output values. The stateless models, e.g., LRR, KRR, and FRNN, may accurately capture instantaneous changes in the degradation KPIs resulting from changing process conditions. Additionally, only small amount training data is required for training the stateless models.

In contrast to stateless model, stateful models only explicitly use the input $x(t)$, not the past inputs $x(t-1), \ldots, x(t-k)$, to forecast the output $y(t)$ for some time point t. Instead, they maintain a hidden state $h(t)$ of the system that is continuously updated with each new time step and thus contains information about the entire past of the time series. The output can then be predicted utilizing both the current input conditions, as well as the hidden state of the model. The stateful model may comprise a recurrent neural network (RNN), such as an echo state network (ESN) and a long short/term memory network (LSTM). Stateful models may be beneficial for correctly predicting long-term changes.

According to an embodiment of the present invention, the stateful model comprises a recurrent neural network (RNN).

RNNs have a hidden state, or "memory", allowing them to memorize important signature of the input signals which only affect the output at later time. This may be seen as an improvement over "memory-less" machine learning methods, since degradation phenomena can exhibit pronounced memory effects.

According to an embodiment of the present invention, the RNN comprises at least one of: an echo state network (ESN) and a long short-term memory (LSTM) network.

RNNs are a powerful method for modeling time series. However, they may be difficult to train since their depth increases with the length of the time series. This may lead to bifurcations of the gradient during the error backpropagation training procedure, which can result in a very slow convergence ("vanishing gradients problem"), if the optimization converges at all.

ESNs are an alternative RNN architecture that bypasses the above-mentioned training related problems of RNNs by not using error backpropagation for training at all. Instead, ESNs use very large randomly initialized weight matrices, which essentially act as a random feature expansion of the input, combined with a recurrent mapping of the past inputs; collectively called the "reservoir". Since the only learned parameters are the weights of the linear model used for the final prediction, ESNs can be trained on smaller datasets without risking too much overfitting.

Another exemplary architecture for dealing with the vanishing gradients problem in RNNs is the long short-term memory (LSTM) architecture. LSTMs are trained using error backpropagation as usual, but avoid the problem of vanishing gradients by using an additional state vector called the "cell state", alongside the usual hidden state. Due to the multiple layers needed to model the gates that regulate the cell state, the LSTM may require larger amounts of training data to avoid overfitting. Though despite its complexity, the stability of the gradients of the LSTM make it very well suited for time series problems with long-term dependencies.

According to an embodiment of the present invention, the stateful model comprises a feedback stateful model, which includes information about a predicted output or a true output from a previous time-step into the input dataset for a current time-step. The predicted output is one or more predicted KPIs at the previous time-step. The true output is one or more measured KPIs at the previous time-step.

Although it is possible to only use the operating parameters to predict the key performance indicators (KPIs) of the process, incorporating the past KPIs as input may serve as a powerful new source of information, especially because of the high autocorrelation of the KPIs across time within the same cycle. One way to incorporate the past KPIs into a stateful model, e.g., LSTM, may be to include the predicted output, or true output if available, from the previous time-step into the input vector for the current time-step.

According to an embodiment of the present invention, the input dataset further includes an indicator variable indicating whether an output of the data driven model from the previous time-step is a predicted output or a true output.

Including the predicted output (or true output) may lead to large prediction errors. The reason for this is that the predicted outputs are only approximations to the true output and thus not as reliable as the true outputs. Since the previous predicted outputs will be used for the next prediction, any small error in the value of the predicted outputs will be thus propagated into the prediction for the next output. Over longer time periods, these small errors will accumulate and can lead the prediction into vastly different direction from the true output time series, leading to very large errors. It is therefore crucial to distinguish the reliable true outputs from the unreliable predicted outputs to the network, so that the network can estimate the reliability of these two variables independently.

One way to achieve this may be to include an indicator variable alongside each feedback output value, which would indicate whether this output value is a true output, i.e. an actual measured KPI from the process, or a predicted KPI, i.e. the output from the stateful model at the previous time-step. In other words, Thus, the feedback stateful model may be achieved simply by appending two values to the input vector at each time-step: the output value of the previous time-step and an indicator variable that is 0 if the feedback value is a true measured KPI or 1 if the feedback value was predicted by the stateful model at the previous step.

According to an embodiment of the present invention, step a) further comprises receiving previously measured process data indicative of a past process condition for a past operation of the at least one chemical process equipment of the chemical production plant within a predefined period prior to the current operation. Step b) further comprises receiving one or more past operating parameters indicative of the past process condition of the at least one chemical process equipment within the predefined period prior to the current operation. In step c), the input dataset further comprises the previously measured process data and the one or more past operating parameters.

The previously measured process data may also be referred to as lagged data. Thus, the stateless model is more robust. By contrast, a stateless model without lagged variables represents systems that respond exclusively to current events. The predefined period prior to the current operation for lagged data may be selected by a model developer, e.g., according to the type of the equipment. For example, the predefined period may be 5%, 10%, or 15% of the typical time period between two maintenance actions of the equipment.

According to an embodiment of the present invention, the stateless model comprises at least one of: a linear ridge regression (LRR), a kernel ridge regression (KRR), and a feed-forward neural network (FFNN).

According to an embodiment of the present invention, the data driven model is a hybrid model that comprises a stateful model for predicting a degradation trend for the one or more degradation KPIs and a stateless model for predicting an additional instantaneous influence of operating parameters on the one or more degradation KPIs. The degradation trend represents a monotonic change of the performance of the chemical process equipment on a time scale longer than a typical production time scale. The additional instantaneous influence of operating parameters contains no time delay in the effect of model inputs on the one or more degradation KPIs.

In this way, the stateful model, e.g., RNNs, are made more data efficient by providing mechanistical pre-information about the process. To make the learning problem simpler for the stateful model, the problem is separated into predicting the short-term, or instantaneous, effects and the long-term behavior of the degradation KPI.

In the basic problem setting of forecasting industrial aging processes (IAPs), all of the processes considered are subject to some underlying degradation process that reduces the process efficiency over time. Since this degradation is long term and occurs across the entire cycle, it is difficult to forecast, since it is influenced by the conditions in the cycle early on, but this dependency is largely unknown and difficult to learn due to the large time lag. However, since engineers are often aware of the basic dynamics underlying the degradation process, it is possible to parametrize the degradation of the KPIs using some parametrized prototype function, whose parameters can be fitted to match the degradation curve of a given cycle perfectly. In order to make the learning problem simpler for the stateful model, the problem is separated into predicting the instantaneous effects and the long-term effects of the input on the KPIs.

One way to isolate the instantaneous effects may be to train a linear model without any temporal information. For example, it is possible to train an LRR model only on the initial time period of the cycles, when the effects of the degradation is still minimal, and without using the time variable as input, so the model does not try to learn from the temporal context but only the instantaneous effects of the inputs on the KPIs. For example, the initial time period of the cycles may be initial 1%-10%, preferably 1%-5%, of the whole cycle, where degradation effects can be expected to be negligible. While this method will only learn the linear instantaneous effects, usually this is enough to remove much of the instantaneous artefacts from the cycle so that the residuals reflect the degradation curve. As mentioned previously, the residuals can then be modelled using a parametrized prototype function whose parameters would be fitted to each degradation curve. In this way, instead of predicting the individual values at each time point of the degradation trend, which is often highly non-stationary, one only needs to use a stateful model to predict one set of parameters per cycle, which are used in the prototype function to model the entire degradation curve. This in turn makes the learning problem more constrained, since one can only model the degradation using functions of the form given by the prototype.

According to an embodiment of the present invention, the stateful model comprises a combination of mechanistical pre-information about the process which is represented by a function with a predefined structure and stateful model which estimates parameters of this function.

Wherein the mechanistical pre-information is represented by a physics-based model comprises ordinary or partial differential equations (ODEs/PDEs) as well as linear or nonlinear algebraic equations e.g. heat or mass balance equations.

According to an embodiment of the present invention, the stateless model comprises a linear model.

The linear model may be used to capture the instantaneous linear dependencies, whereas the stateful model may be used to capture the long-term degradation trend. In an example, the linear model may comprise an LRR.

In some examples, the hybrid model further comprises a non-linear model. In general, the linear model only captures the instantaneous linear dependencies, and the stateful model would ideally capture the long-term degradation trend. However, since the prototype function may not always be a perfect fit for the degradation and there will still be some artifacts that are not linear or instantaneous and are thus not captured by the linear model, we need a nonlinear model, e.g., LSTMs, that would try to model these additional short-term artifacts separately at each time point. In other words, it is possible to combine one linear model and two stateful models in a hybrid model, e.g., one LSTM for the long-term degradation and one LSTM for the short artifacts, we name this model the two-speed model, According to an embodiment of the present invention, the input dataset further comprises at least one transformed process data representing a function of one or more parameters of the currently measured process data and/or the previously measured process data.

In other words, engineered features, built from the process data, may be used as additional inputs. These engineered features may include time on stream since last regeneration (e.g. catalysator or heat exchanger), time on stream since last exchange (e.g. catalysator or heat exchanger), process conditions at end of last run, duration of regeneration of last run, duration of last run, etc.

In some examples, the historical data may comprise one or more transformed process data which encode information about a long-term effect on degradation of the at least one chemical process equipment. The method may further comprise estimating a future value of the at least one key performance indicator within a prediction horizon over multiple runs. In other words, these engineering features may be in particular relevant as they may encode information about the long-term effects in the system, such as coke residues accumulating on the time scale of months and years. By including these long-term effects in the historical data, the data driven model may be trained to forecast the degradation in the currently running cycle, as well as long-term effects of the degradation on multiple running cycles.

A second aspect of the present invention relates to an apparatus for predicting a progress of degradation of a chemical production plant. The apparatus comprises an input unit and a processing unit. The input unit is configured to receive currently measured process data indicative of a current process condition for a current operation of at least one chemical process equipment of the chemical production plant, wherein the at least one chemical process equipment has one or more degradation key performance indicators, KPIs, for quantifying the progress of degradation of the at least one chemical process equipment. The input unit is further configured to receive one or more expected operating parameters indicative of a planned process condition of the at least one chemical process equipment within a prediction horizon. The processing unit is configured to perform the method steps as described above and below.

A third aspect of the present invention relates to a computer program element for instructing an apparatus as described above and below, which, when being executed by a processing unit, is adapted to perform the method steps as described above and below.

A fourth aspect of the preset invention relates to a computer readable medium having stored the program element.

As used herein, the term "aging" may refer to the effect whereby a component suffers some form of material deterioration and damage (usually, but not necessarily, associated with time in service) with an increasing likelihood of failure over the lifetime. Ageing equipment is equipment for which there is evidence or likelihood of significant deterioration and damage taking place since new, or for which there is insufficient information and knowledge available to know the extent to which this possibility exists. The significance of deterioration and damage relates to the potential effect on the equipment's functionality, availability, reliability and safety. Just because an item of equipment is old does not necessarily mean that it is significantly deteriorating and damaged. All types of equipment may be susceptible to ageing mechanisms. Overall, ageing plant is plant which is, or may be, no longer considered fully fit for purpose due to deterioration or obsolescence in its integrity or functional performance. 'Ageing' is not directly related to chronological age.

As used herein, the term "degradation" may refer to the potential degradation of plant and equipment due to age related mechanisms such as coking, sintering, poisoning, fouling and erosion.

As used herein, the term "algorithm" may refer to a set of rules or instructions that will train the model to do what you want it to do.

As used herein, the term "model" may refer to a trained program that predicts outputs given a set of inputs.

BRIEF DESCRIPTION OF THE DRAWINGS

These and other aspects of the invention will be apparent from and elucidated further with reference to the embodiments described by way of examples in the following description and with reference to the accompanying drawings, in which.

Figure 1:
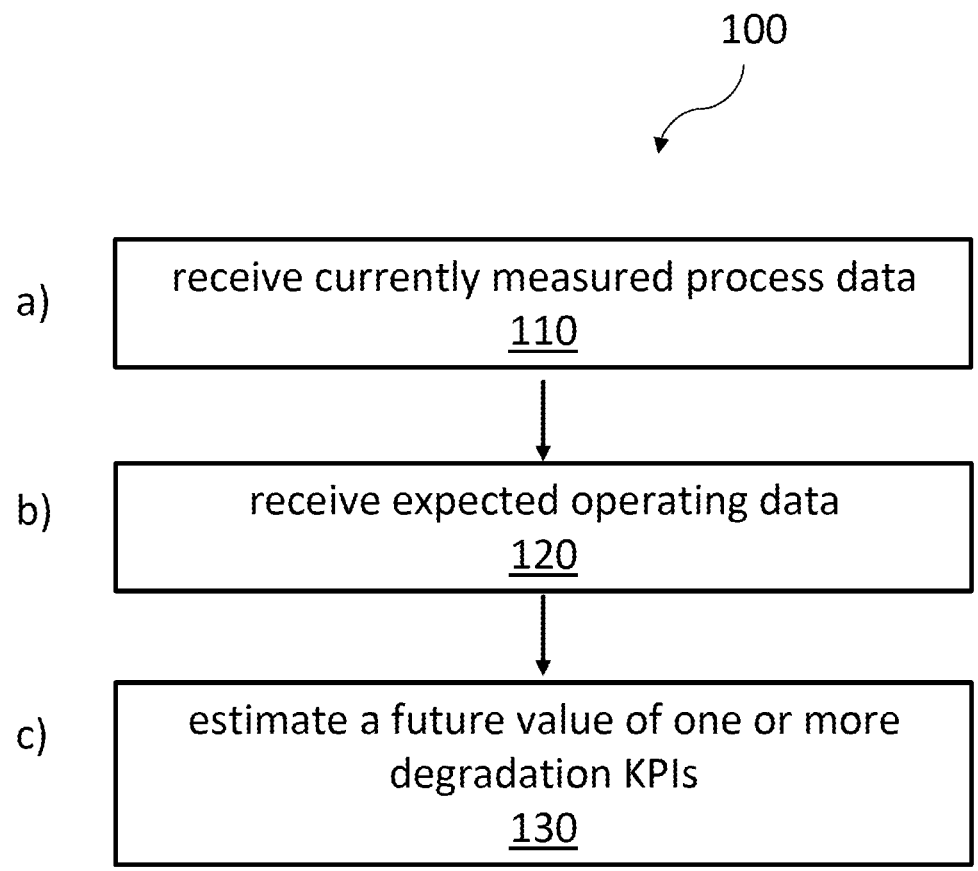
FIG. 1 shows a flow chart illustrating a computer-implemented method for predicting a progress of degradation in an equipment of a chemical production plant.

It should be noted that the figures are purely diagrammatic and not drawn to scale. In the figures, elements which correspond to elements already described may have the same reference numerals. Examples, embodiments or optional features, whether indicated as non-limiting or not, are not to be understood as limiting the invention as claimed.

DETAILED DESCRIPTION OF EMBODIMENTS

FIG. 1 shows a flow chart illustrating a computer-implemented method 100 for predicting a progress of degradation of a chemical production plant.

In step 110, i.e. step a), currently measured process data is received via an input channel. The currently measured process data is indicative of a current process condition for a current operation of at least one chemical process equipment of the chemical production plant.

In some examples, the at least one chemical process equipment may be operated in a cyclic manner including multiple runs. Each run includes one production phase followed by a regeneration phase.

Figure 2:
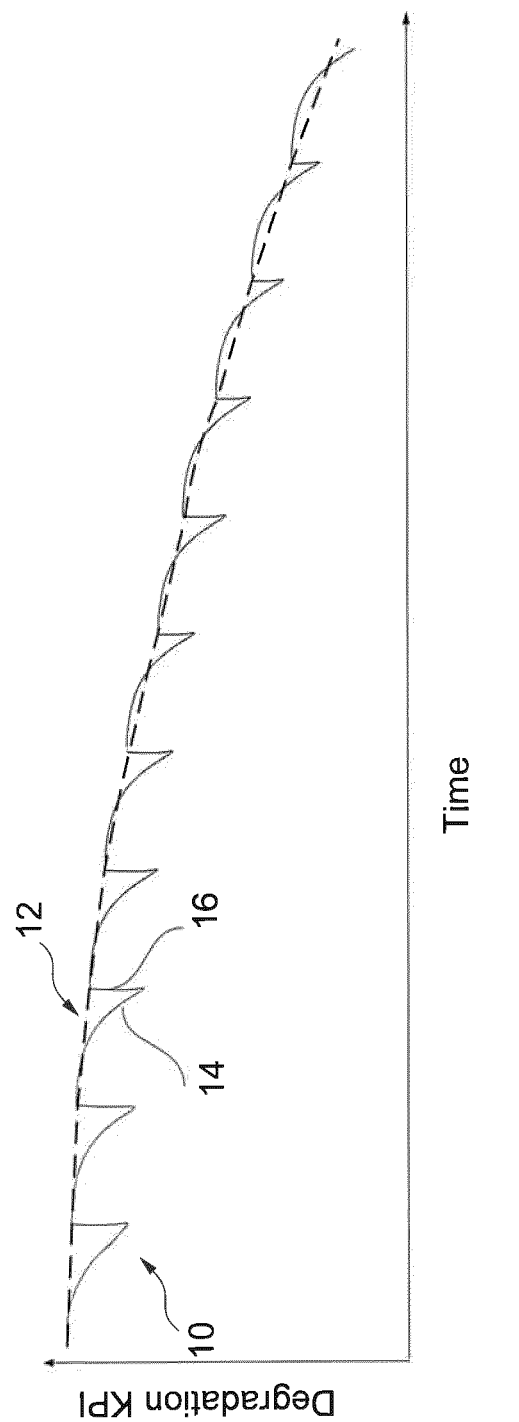
FIG. 2 illustrates an exemplary degradation behavior of a process equipment in the presence of the regeneration phases.

FIG. 2 illustrates an exemplary degradation behavior of a process equipment in the presence of the regeneration phases. Continuous line 10 represents the degradation behavior within one cycle, whereas the dashed line 12 represents the degradation of the process equipment over the whole lifetime of the process equipment, e.g. within one catalyst charge. In the example of FIG. 2, the process equipment is operated in a cyclic manner including eleven cycles over the whole lifetime of the process equipment. Each cycle has a production phase 14 followed by a regeneration phase 16. Regeneration phase 16 is a very important specific part of the process because that may lead to the returning the KPI to its baseline (indicated with the dashed line 12) after regeneration procedure even without exchange of the process equipment. The presence of the regeneration phase may lead to the complex degradation behaviour. In this case the process equipment or catalyst may experience the degradation on a different time scales. As shown in FIG. 2, a degradation behaviour is observed within one cycle with the regeneration phase at the end of the cycle and at the same time, the degradation is observed over the whole lifetime of the process equipment or a catalyst charge.

The presence of the regeneration phase also has an impact on the definition of the input parameters of the data driven model. In this case, additional input parameters may be required for improving the accuracy of the prediction. For example, the process information from last run may be provided as additional input parameters. The process information from the last run may further comprise at least one of: time on stream since last regeneration (e.g. catalysator or heat exchanger), time on stream since last exchange (e.g. catalysator or heat exchanger), process conditions at end of last run, duration of regeneration of last run, duration of last run, etc.

In an example, the process data may comprise sensor data available from the chemical production plant. Examples of the sensor data may include, but not limited to, temperatures, pressures, flows, levels, and compositions. For the equipment, appropriate sensors may be selected which provide information about the health state of the considered equipment. Alternatively or additionally, the process data may comprise quantities directly or indirectly derived from such sensor data, i.e., one or more derived parameters representing a function of one or more parameters contained in a set of the measured process data.

Turning back to FIG. 1, in step 120, i.e. step b), one or more expected operating parameters indicative of a planned operating condition of the at least one chemical process equipment within a prediction horizon are received via the input channel. The one or more expected parameters may be known and/or controllable over the prediction horizon. In other words, the one or more expected operating parameters may be planned or anticipated over the prediction horizon. Step 110 and step 120 may be performed sequentially or in parallel.

In step 130, i.e. step c), a data driven model is applied by a processor to an input dataset comprising the currently measured process data and the one or more expected operating parameters to estimate a future value of the one or more degradation KPIs within the prediction horizon. The data driven model is parametrized or trained according to a training dataset. The training dataset is based on sets of historical data comprising process data and the one or more degradation KPIs of one or more chemical process equipment, wherein the one or more chemical process equipment are operated in a cyclic manner including multiple runs, wherein each run includes one production phase followed by a regeneration phase. The set of historical data may include data from multiple runs and/or multiple plants.

The one or more degradation KPIs may be selected from parameters comprising a parameter contained in a set of measured process data. Alternatively or additionally, the one or more degradation KPIs are selected from parameters comprising a derived parameter representing a function of one or more parameters contained in a set of the measured process data.

Despite the large variety of affected asset types, and the completely different physical or chemical degradation processes that underlie them, all of these phenomena may share some of the following essential characteristics:

1. The considered critical asset has one or more key performance indicators (KPIs), which quantify the progress of degradation.
2. On a time scale much longer than the typical production time scales (i.e., batch time for discontinuous processes; typical time between set point changes for continuous processes), the KPIs drift more or less monotonically to ever higher or lower values, indicating the occurrence of an irreversible degradation phenomenon. (On shorter time scales, the KPIs may exhibit fluctuations that are not driven by the degradation process itself, but rather by varying process conditions or background variables such as, e.g., the ambient temperature.) For example, the degradation KPI illustrated in FIG. 2, which is indicated with the continuous line 10, drifts monotonically to a lower value, indicating the occurrence of an irreversible degradation phenomenon.
3. The KPIs return to their baseline after maintenance events, such as cleaning of a fouled heat exchanger, replacement or regeneration of an inactive catalyst, etc. For example, the degradation KPI illustrated in FIG. 2 returns to its baseline (indicated with the dashed line 12) after regeneration procedure even without exchange of the process equipment.
4. The degradation is no 'bolt from the blue'—such as, e.g., the bursting of a flawed pipe—, but is rather driven by creeping, inevitable wear and tear of process equipment.

Any aging phenomenon with these general properties is addressed by the present disclosure. the asset may be operated in a cyclic manner including multiple runs, wherein each run includes one production phase followed by a regeneration phase.

Property (4) suggests that the evolution of a degradation KPI is to a large extent determined by the process conditions, and not by uncontrolled, external factors. This defines the central problem addressed by the present disclosure: Developing accurate models to forecast the evolution of the degradation KPI over a certain time horizon, given the planned process conditions in this time frame.

The expected degradation behavior of a chemical process component, i.e., individual asset such as heat exchanger or reactor, under expected operating conditions are determined using a pre-trained data-driven model. Based on a pre-defined end-of-run criterion end of run is predicted (e.g., a switch from production to regeneration phase, catalyst exchange).

In step 140, i.e. step d), the future value of the one or more degradation KPIs within the prediction horizon is provided via an output channel, which is usable for monitoring and/or controlling.

Based on this information, necessary controlling actions may be implemented to prevent unplanned production losses due to degradation or failure of process equipment. For example, the future value of the one or more KPIs may be compared to a threshold to determine a time in the future at which the threshold is met. This time information may then either be provided via an output channel or used for predicting a maintenance event. In this way, the planning and alignment of downtime between the different chemical process equipment can be improved, e.g., by avoiding parallel downtime of two or more chemical equipment. Data typically used in this context for the prediction model is created close to production process by sensors in the plant.

In the following, we disclose some examples of data-driven models for the task of IAP prediction, comparing some traditional stateless models, including LRR, KRR, and FFNN, to more complex stateful recurrent neural networks ESN and LSTM. In addition, we also evaluate a feedback stateful model, e.g., feedback LSTM, and a hybrid model. To examine how much historical data is needed to train each of the models, we first examine their performance on a synthetic dataset with known dynamics. Then, in a second step, the models are tested on real-world data from a large-scale chemical plant.

1. Problem Definition

Figure 3:
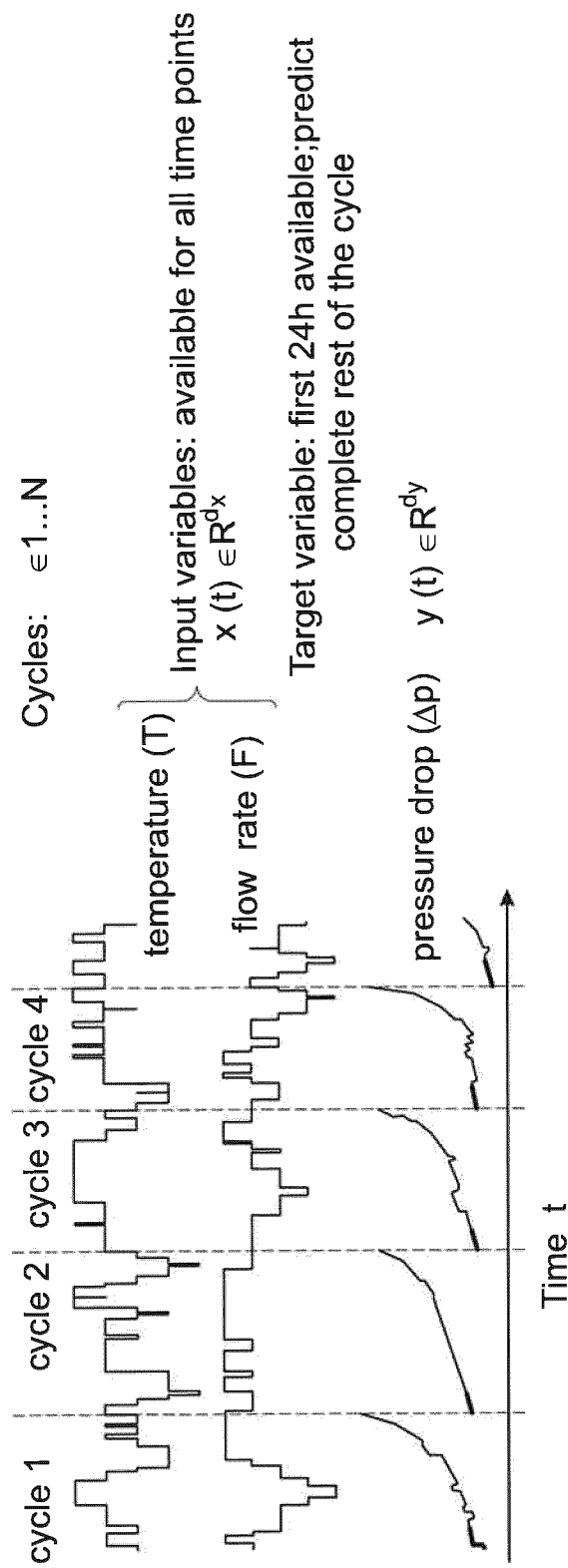
FIG. 3 illustrates an example of an industrial aging process (IAP) forecasting problem.

The general industrial aging process (IAP) forecasting problem is illustrated in FIG. 3: The aim is to model the evolution of one or several degradation KPIs $y_i(t) \in R^{d_y}$ within an upcoming time window $t \in [0, T_i]$ between two maintenance events, referred to as the i-th degradation cycle, as a function of the planned process conditions $x_i(t) \in R^{d_x}$ in this cycle:

$$\{x_i(t), \in_i(t)\}_{t \in [0, T_i]} \rightarrow \{y_i(t)\}_{t \in [0, T_i]}, \quad (1)$$

where $\in_i(t)$ denotes stochastic noise that disturbs the deterministic relation between $x_i$ and $y_i$.

FIG. 3 illustrates the industrial aging process (IAP) forecasting problem. The degradation KPI, e.g., pressure drop $\Delta p$ in a fixed bed, increases over time (e.g. due to coking), influenced by the (manually controlled) process conditions I and II (e.g. reaction temperature T and flow rate F). While the example shows two process parameters the claimed method would also apply to one process parameter or a multitude larger than two. The KPI recovers after a maintenance event, which segments the time axis into different degradation cycles. The IAP forecasting task is to predict the evolution of the KPI, i.e., the target (dependent) variable $y_i(t)$, in the current cycle i, given the upcoming process conditions, i.e., the input (independent) variables $x_i(t)$.

Degradation phenomena may exhibit pronounced memory effects, which means that a certain input pattern $x(t)$ may affect the output $y(t')$ only at much later times $t' > t$. In addition, these memory effects can also occur across multiple time scales, which makes these processes notoriously hard to model. As an example, consider a heat exchanger suffering from coking of the inner tube walls. The observed heat transfer coefficient serves as KPI $y_i(t)$, and process conditions $x_i(t)$ comprise mass flow, chemical composition and temperature of the processed fluid. The time horizon is one cycle between two cleaning procedures (e.g. burn-off). If at an early time $t_1$ in the cycle an unfavorable combination of low mass flow, high content of coke precursors, and high temperature occurs, first coke patches can form at the wall, which are not yet big enough to impact heat transfer significantly. However, they serve as nuclei for further coke formation later in the cycle, so that $y_i(t)$ drops faster at $t > t_1$ compared to a cycle where the process conditions were not unfavorable around $t_1$, but with very similar process conditions throughout the rest of the cycle.

An additional complication may arise from the fact that in real application cases, the distinction between degradation KPI y, process conditions x, and uncontrolled influencing factors is not always clear-cut. Consider, for example, the case of a heterogeneous catalyst subject to deactivation, where the loss of catalytic activity leads to a decreased conversion rate. In this case, the conversion rate could serve as a target degradation KPI y, while process conditions, such as the temperature, which are manually controlled by the plant operators, would be considered input variables x for the model. However, the plant operators might try to keep the conversion rate at a certain set point, which can be achieved by raising the temperature to counteract the effects of the catalyst degradation. This introduces a feedback loop between the conversion rate and the temperature, which means the temperature cannot be considered an independent variable anymore, as its actual value may depend, or partially depend, on the target. Therefore, care may have to be taken, since including such a dependent variable as an input x in a model could lead one to report overly optimistic prediction errors that would not hold up when the model is later used in reality.

2. Datasets

To gain insights into and evaluate different machine learning models for the IAP forecasting problem, we consider two datasets: one synthetic, which we generated ourselves using a mechanistic model, and one containing real-world data from a large plant at BASF. Both datasets are described in more detail below.

The reason for working with synthetic data is that this allows us control two important aspects of the problem: data quantity and data quality. Data quantity is measured, e.g., by the number of catalyst lifecycles in the dataset, which can be chosen as large as we want for synthetic data, to test even the most data-hungry machine learning methods. Data quality refers to the level of noise in the dataset, or, in other words, the degree to which the degradation KPI y(t) is uniquely determined by the provided process conditions x(t) in the dataset. In a synthetic dataset based on a deterministic degradation model, we know that there is a functional mapping between x and y, i.e., there exists no fundamental reason that could prevent a machine learning model from learning this relation with vanishing prediction errors. In contrast, with real data, a bad prediction error can either be a problem of the method, and/or of the dataset, which might not contain sufficient information on the input side x to accurately predict the output quantity y.

2.1 Synthetic Dataset

In the following example, synthetic dataset is used to mimics process data from a reactor undergoing catalyst deactivation and periodic regeneration. For the synthetic dataset, we modeled the wide-spread phenomenon of slow, but steady loss of catalytic activity in a continuously operated fixed-bed reactor. Ultimately, the catalyst deactivation leads to unacceptable conversion or selectivity rates in the process, necessitating a catalyst regeneration or replacement, which marks the end of one cycle.

The chemical process in the reactor under consideration is the gas-phase oxidation of an olefine. To generate the time series for all variables, we used a mechanistic process model with the following ingredients:

Mass balance equations for all five relevant chemical species (olefinic reactant, oxygen, oxidized product, $CO_2$, water) in the reactor, which is, for simplicity, modeled as an isothermal plug flow reactor, assuming ideal gas law. The reaction network consists of the main reaction (olefine+$O_2 \rightarrow$product) and one side reaction (combustion of olefine to $CO_2$).

A highly non-linear deactivation law for the catalyst activity, which depends on reaction temperature, flow rate, and inflowing oxygen, as well as the activity itself.

Kinetic laws for the reaction rates.

A stochastic process determining the process conditions (temperature, flow rate, etc.).

Based on the current process conditions and hidden states of the system, the mechanistic model generates a multivariate time series [x(t), y(t)] for roughly 2000 degradation cycles. The final dataset includes for each time point t as input x(t) the five operating parameters (mass flow rate, reactor pressure, temperature, and mass fractions of the two reactants olefine and $O_2$) and two degradation KPIs y(t) (conversion and selectivity).

Figure 4:
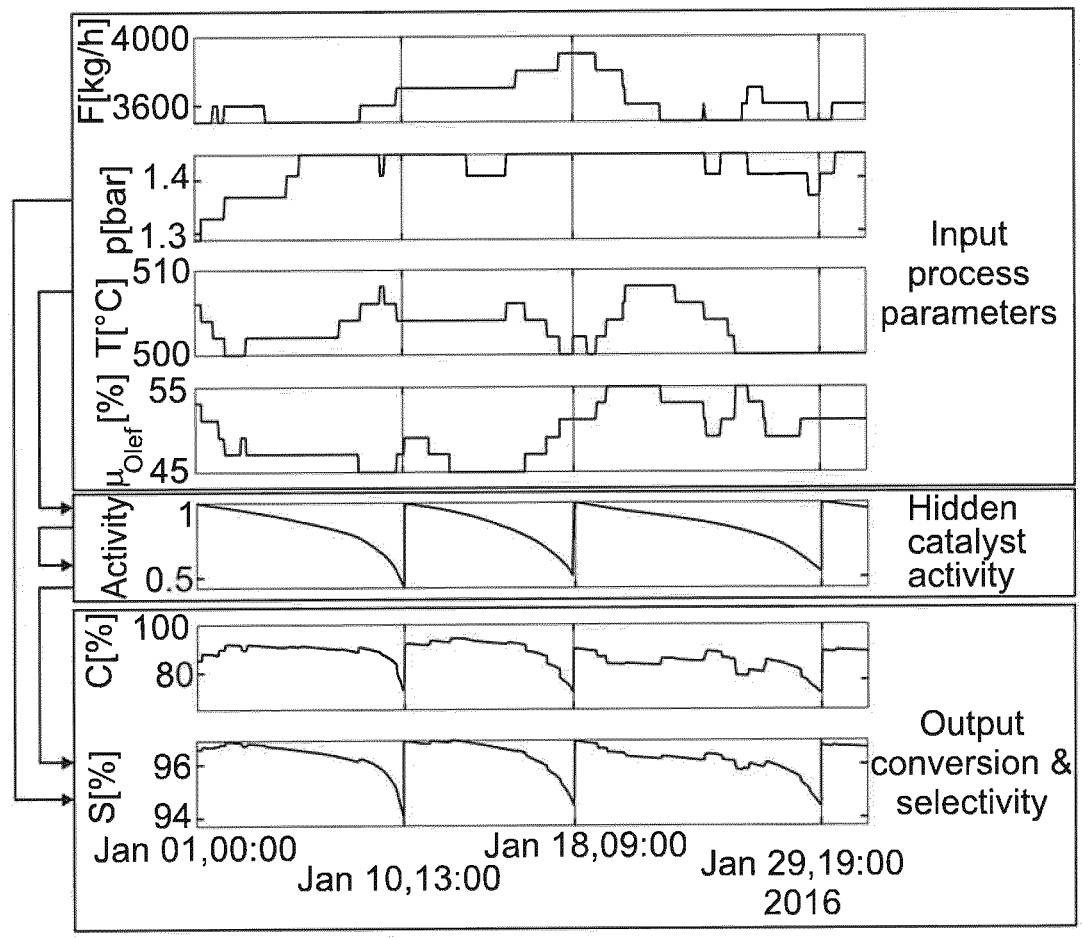
FIG. 4 illustrates an example of one month of a synthetic dataset, showing loss of catalytic activity in a fixed-bed reactor.

To give an impression of the simulated time series, one month of data is shown in FIG. 4, which illustrates one month of the synthetic dataset, showing loss of catalytic activity in a fixed-bed reactor. At each time point t, the vector of process conditions x(t) comprises the reactor temperature T, mass flow rate F, reactor pressure p, and mass fractions $\mu_z$ of the reactants at the reactor inlet. Degradation KPIs y(t) are conversion and selectivity of the process.

The duration of deactivation cycles is around 8-10 days. The catalyst activity A(t) is a hidden state and therefore not part of the dataset, but is only shown to illustrate the dynamics of the problem: System output y(t) (selectivity and conversion) is not only affected by the current operating parameters x(t), but also the current catalyst activity A(t), which is non-linearly decreasing over each cycle.

In addition to the operating parameters, the cumulative feed of olefine in the current cycle is also added to the dataset as a potential input quantity. This variable is often taken as a rough predictor of the catalyst activity. Therefore, it is usually calculated and monitored in the plant. In the language of machine learning, this variable represents an engineered feature of the raw input time series. This way, some basic domain knowledge about catalyst deactivation is added to the dataset.

2.2 Real-World Dataset

The second dataset contains process data for the production of an organic substance in a continuous world-scale production plant at BASF. The process is a gas phase oxidation in a multi-tubular fixed-bed reactor.

The catalyst particles in the reactor suffer from degradation, in this example coking, i.e., surface deposition of elementary carbon in form of graphite. This leads to reduced catalytic activity and increased fluid resistance. The latter is the more severe consequence and leads to an increasing pressure drop over the reactor, as measured by the difference $\Delta p$ of gas pressure before and after the reactor. In this example the KPI is the pressure drop.

Figure 5:
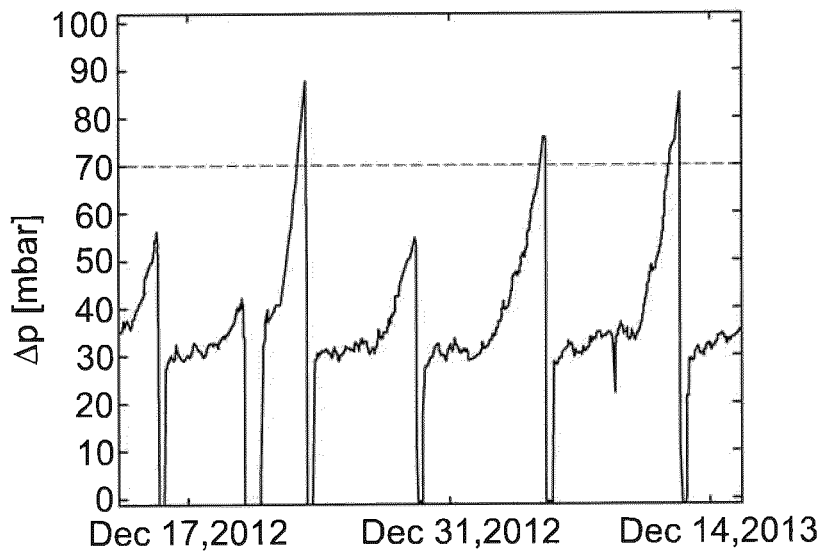
FIG. 5 illustrates an example of one month of historical data of a real-world dataset, showing the pressure loss $\Delta p$ over the reactor.

When $\Delta p$ exceeds a pre-defined threshold, the so-called end-of-run (EOR) criterion is reached. Then, the coke layer is burned off in a dedicated regeneration procedure, by inserting air and additional nitrogen into the reactor at elevated temperatures for a variable number of hours. Operational reasons can lead to a delayed burn-off with $\Delta p$ exceeding the EOR threshold, or, vice versa, a premature burn-off when $\Delta p$ has not yet reached the EOR threshold. Some exemplary cycles for $\Delta p$ are shown in FIG. 5, which illustrates one month of historic data of the real-world dataset, showing the pressure loss $\Delta p$ over the reactor, which is the degradation KPI y(t) in this IAP forecasting problem. When $\Delta p$ reaches a value in the order of the EOR threshold of 70 mbar, the cokes deposit is burned off, which marks the end of a cycle.

Since coke is not removed perfectly by this burn-off procedure, coke residues accumulate from regeneration to regeneration, making the pressure drop issue ever more severe. Therefore, the entire catalyst bed must be replaced every 6-24 months.

As an option, the historical data may comprise one or more transformed process data which encode information about a long-term effect on degradation of the at least one chemical process equipment. The method may further comprise estimating a future value of the at least one key performance indicator within a prediction horizon over multiple runs. Accordingly, these engineering features may be in particular relevant as they may encode information about the long-term effects in the system, such as coke residues accumulating on the time scale of months and years. By including these long-term effects in the historical data, the data driven model may be trained to forecast the degradation in the currently running cycle, as well as long-term effects of the degradation on multiple running cycles.

Suspected influencing factors for the coking rate are:
1. mass flow F through the reactor ("feed load")
2. ratio of organic reactant to oxygen in the feed
3. intensity of previous regeneration procedures
4. length of the previous degradation cycle The dataset contains seven years of process data from the four most relevant sensors, extracted from the plant information management system (PIMS) of the plant, as listed in Table 1. Given the time scale of 4 to 7 days between two burn-off procedures, this corresponds to 375 degradation cycles belonging to three different catalyst batches. The sampling rate is 1/hour for all variables with a linear interpolation to that time grid.

TABLE 1

| Variable Name | Unit | Description | Type |
| --- | --- | --- | --- |
| PD | mbar | pressure difference $\Delta p$ over reactor | y |
| T | ° C. | reaction temperature | x |
| F_R | kg/h | inflow of organic reactant into reactor | x |
| F_AIR | kg/h | mass inflow air into reactor | x |

The task is to predict, at an intermediate moment $t_k$ during a degradation cycle, the coking-induced pressure drop $\Delta p$ over the entire remaining duration of the cycle. Of particular interest is a prediction of the time point $t_{EOR}$ at which the EOR threshold $\Delta p^{max}$=70 mbar is reached. As mentioned above, several relevant operating parameters may serve as input variables x(t) of the model (see Table 1). Furthermore, engineered features, built from either those operating parameters or from the degradation KPI $\Delta p$ in the previous cycles, may be used as additional inputs. Examples of these additional inputs are listed in the following Table 2:

TABLE 2

| Variable Name | Unit | Description |
| --- | --- | --- |
| operation_mode | — | logical variable indicating state of operation (1: reaction; 2: regeneration; 0: other mode of operation, e.g., shut-down) |

TABLE 2-continued

| Variable Name | Unit | Description |
| --- | --- | --- |
| cat_no | — | counter to index different catalyst batches; incremented whenever catalyst is replaced |
| cycle_no | — | counter to index different cycles; incremented when new reaction phase begins |
| t_react | h | duration of current cycle, i.e., hours of operation in reaction phase after last regeneration procedure |
| last_PD | mbar | pressure loss (PD) at the end of the previous cycle |
| F_AIR/F_R | — | ratio air to organic reactant in feed |
| F_AIR + F_R | kg/h | total feed rate (organic reactant + air) |

3. Input Quantities

For the asset a key performance indicator is required that is directly or indirectly connected to the degradation status. For every prediction, process data measured for the chemical process elements is required. Such process data may include current process conditions. the at least one chemical process equipment may be operated in a cyclic manner including multiple runs. Each run includes one production phase followed by a regeneration phase. The input dataset for the data driven model may further comprise at least one process information from last run, such as time on stream since last regeneration (e.g. catalysator or heat exchanger), time on stream since last exchange (e.g. catalysator or heat exchanger), process conditions at end of last run, duration of regeneration of last run, duration of last run, etc. The key performance indicator is a parameter provided as process data or derived from the provided process data. Expected operating conditions (such as flow rates, controlled reaction temperature) for the current production run of the chemical process element are required to forecast.

4. Model Architecture

We will now frame the IAP forecasting problem in a machine learning setting. To this end, the mapping defined in Eq. (1) is expressed as a concrete function $f$ that returns $\hat{y}_i(t)$, an estimate of the KPIs at a time point t in the ith degradation cycle, based on the process conditions $x_i$ at this time point as well as possibly up to k hours before t:

$$\hat{y}_i(t)=f(x_{i(t)},[x_i(t-1),\ldots,x_i(t-k)]) \forall t \in [0,\ldots,T_i]. \quad (2)$$

The task is to predict $y_i(t)$ for the complete cycle (i.e., up to $T_i$), typically starting from about 24 hours after the last maintenance event that concluded the previous cycle.

In Eq. (2), the prediction function $f$ is defined as a function of the current and past input variables $x_i$. Since usually the values of the degradation KPIs y, are known for at least the first 24 hours of each cycle, in principle the set of input variables of $f$ could be extended to also include $y_i(t')$ for t'<t. However, while this might improve the predictions at the beginning of the cycle, since our aim is to predict the complete cycle starting after the first 24 hours, for the predictions for most time points, not the real values $y_i(t')$ could be used as input, but instead their predicted values $\hat{y}_i(t')$ would have to be used. Since these predicted values typically contain at least a small error, the forecast for time points further in the future would be based on noisier and noisier input data, as the prediction errors in the input variables $\hat{y}_i(t')$ would quickly accumulate. Therefore, the only explicit inputs to the model are the predefined process conditions $x_i$. This restriction, however, is overcome by the model variants discussed in section 4.3 ("Feedback stateful models").

The exact form of the function $f$ thereby depends on the kind of machine learning method that is chosen for the forecasting task. Yet, while the chosen machine learning model determines the form of the function, its exact parameters need to be adapted to fit the dataset at hand in order to yield accurate predictions. For this, first the available data is split into so-called "training" and "test" sets, where each of the two sets contains the entire multivariate time series from several mutually exclusive degradation cycles from the original dataset, i.e., multiple input-output pairs $\{x_i(t),y_i(t)\}_{t \in [0,T_i]}$ consisting of the planned conditions x and degradation KPIs y of the given process. Then, using the data in the training set, the machine learning algorithm learns the optimal parameters of $f$ by minimizing the expected error between the predicted KPIs $\hat{y}_i(t)$ and the true KPIs $y_i(t)$. After the machine learning model has been trained, i.e., when $f$ predicts $y_i(t)$ as accurately as possible on the training set, the model should be evaluated on new data to give an indication of its performance when later used in reality. For this, the test set is used. If the performance on the training set is much better than on the test set, the model does not generalize well to new data and is said to have "overfit" on the training data.

In addition to the regular parameters of $f$, many machine learning models also require setting some hyperparameters, that, for example, determine the degree of regularization (i.e., how much influence possible outliers in the training set can have on the model parameters). To find adequate hyperparameters, cross-validation can be used: here, in multiple iterations the training set is split further into a validation and a training part and a model with a specific hyperparameter setting is trained on the training part and evaluated on the validation part. Those hyperparameter settings that produce the best results on the validation splits are then used when training a final model on the whole training set, which is then evaluated on the set-aside test set as described above.

The machine learning models for time series prediction may be divided into two main subgroups: stateless and stateful models.

Figure 6:
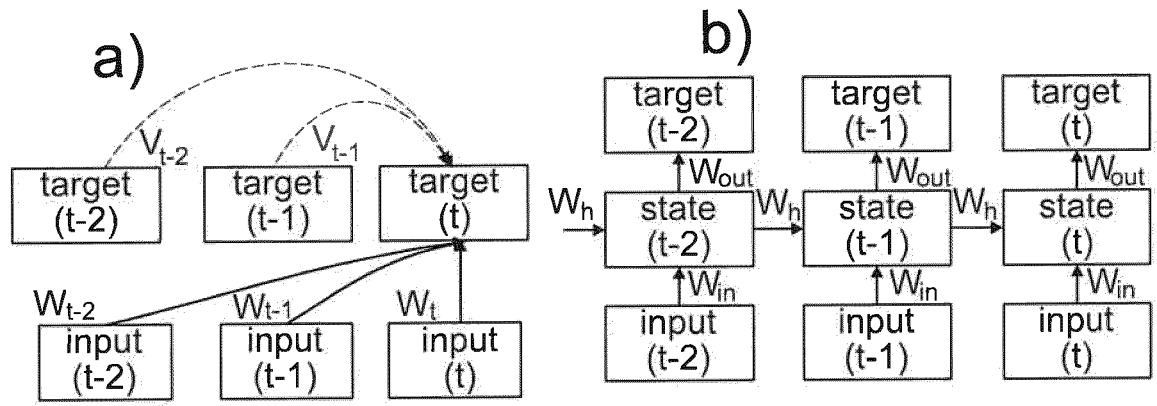
FIG. 6 shows a comparison of stateless and stateful models for time series forecasting.

FIG. 6 illustrates a comparison of stateless and stateful models for time series casting. FIG. 6(a) shows a stateless model, which bases the predictions on the information contained in a fixed time windows in the past, while FIG. 6(b) illustrates a stateful model, where information about the past in the maintained and propagated using a hidden state.

A stateless model directly predicts the output given the current inputs, independent of the predictions for previous time points. Stateful models, on the other hand, maintain an internal hidden state of the system that encodes information about the past and which is utilized in addition to the current process conditions when making a prediction.

Stateless models include most typical machine learning regression models, ranging from linear regression models to many types of neural networks. The stateless regression models that we will explore in this paper are linear ridge regression (LRR), kernel ridge regression (KRR), and feed-forward neural networks (FFNN), i.e., one linear and two non-linear prediction models. The most commonly used stateful models for the modeling of sequential data are recurrent neural networks (RNNs). While RNNs are some of the most powerful neural networks, capable of approximating any function or algorithm, they are also more involved to train. Consequently, in this paper we chose to model IAPs using two different RNN architectures that are designed precisely to deal with the problems arising while training regular RNNs: echo state networks (ESN) and long short-term memory (LSTM) networks.

In addition, two main variations on the basic stateful model are introduced to improve the performance on the real world dataset: including a feedback loop that incorporates the past predicted outputs as additional inputs and separating the model into two or more different models that would predict different aspects of the output dynamics (e.g. instantaneous effects vs long term trend).

The seven machine learning models are introduced in the following paragraphs. For simplicity, in many cases we only write x and y, omitting the reference to the current cycle i and time points t in questions, while x might include the process conditions for multiple time points from a fixed time window in the past (i.e. up to t−k).

4.1 Stateless Models

Stateless models are machine learning models that base their forecast only on the inputs within a fixed time window in the past, i.e., exactly as stated in Eq. (2).

Linear Ridge Regression (LRR)

LRR is an ordinary linear regression model with an added regularization term that prevents the weights from taking on extreme values due to outliers in the training set. The target variables y are predicted as a linear combination of the input variables x, i.e., $$\hat{y}=Wx$$

where $W \in R^{d_y \times d_x}$ is a weight matrix, i.e., the model parameters of $f$ that are learned from the training data. The simple model architecture, globally optimal solution, and regularization of LRR all contribute to reducing overfitting of the model. Additionally, training and evaluating the model is not computationally expensive, making it a viable model for large amounts of data as well. Despite their relative simplicity, linear models are widely used in many application scenarios and can often be used to approximate real-world processes at fairly high accuracies, especially if additional (non-linear) hand-engineered features are available. Furthermore, considering the limited amount of training data that is usually available for real-world IAP problems, reliably estimating the parameters of more complex non-linear prediction models such as deep neural networks needs to be done with great care, while linear models provide a more robust solution as they provide a globally optimal solution and are less likely to overfit given their linear nature. For a detailed discussion concerning the LRR model, reference is made to the following publications: Draper N R, Smith H. Applied regression analysis, vol. 326. John Wiley & Sons; 2014, and Bishop C M, Nasrabadi N M. Pattern Recognition and Machine Learning. Journal of Electronic Imaging 2007; 16(4).

Kernel Ridge Regression (KRR)

KRR is a non-linear regression model that can be derived from LRR using the so called 'kernel trick'. Instead of using the regular input features x, the features are mapped to a high (and possibly infinite) dimensional space using a feature map $\phi$, corresponding to some kernel function k such that $\phi(x)^T \phi(x')=k(x, x')$. By computing the non-linear similarity k between a new data point x and the training examples $x_j$ for $j=1, \ldots, N$, the targets y can be predicted as $$\hat{y} = \sum_{j=1}^{N} \alpha_j k(x, x_j),$$

where $\alpha_j$ are the learned model parameters.

The non-linear KRR model can adapt to more complex data compared to LRR, and the fact that the globally optimal solution can be obtained analytically have made KRR one of the most commonly used non-linear regression algorithms. However, the performance of the model is also more sensitive to the choice of hyperparameters, so a careful selection and optimization of the hyperparameters is necessary. Additionally, the fact that computing the kernel matrix scales quadratically with the number of training examples N makes it difficult to apply KRR to problems with large training sets. For a detailed discussion concerning the KRR model, reference is made to the following publications: Draper N R, Smith H. Applied regression analysis, vol. 326. John Wiley & Sons; 2014, Bishop C M, Nasrabadi N M. Pattern Recognition and Machine Learning. Journal of Electronic Imaging 2007; 16(4), and Scholkopf B, Smola A J. Learning with kernels: support vector machines, regularization, optimization, and beyond. MIT press; 2001.

Feed-Forward Neural Networks (FFNN)

FFNNs were the first and most straightforward type of neural networks to be conceived, yet, due to their flexibility, they are still successfully applied to many different types of machine learning problems ranging from classification and regression tasks to data generation, unsupervised learning, and more. Analogously to LRR, FFNNs learn a direct mapping $f$ between some input parameters x and some output values y. However, unlike a linear model, FFNNs can approximate also highly non-linear dependencies between the inputs and the outputs. This is achieved by transforming the input using a succession of "layers", where each layer is usually composed of a linear transformation followed by a non-linear operation $\sigma$:

$$\hat{y}=\sigma_l(W_l \ldots \sigma_2(W_2\sigma_1(W_1x))).$$

In some cases, FFNNs may be difficult to train since the error function is highly non-convex and the optimization procedure usually only finds a local minimum, in contrast to the globally optimal solution found by LRR and KRR. However, the losses in these local minima are often similar to the global optimum, so this properties does not significantly impact the performance of a properly trained neural network. Additionally, due to a FFNN's large number of parameters $(W_1, \ldots, W_l)$ and high flexibility, if not properly trained it may overfit, especially when using smaller training sets. For a detailed discussion concerning the KRR model, reference is made to the following publications: Draper N R, Smith H. Applied regression analysis, vol. 326. John Wiley & Sons; 2014, Bishop C M, Nasrabadi N M. Pattern Recognition and Machine Learning. Journal of Electronic Imaging 2007; 16(4), and Jaeger H. The "echo state" approach to analysing and training recurrent neural networks—with an erratum note. Bonn, Germany: German National Research Center for Information Technology GMD Technical Report 2001; 148(34):13.

4.2 Stateful Models

In contrast to stateless models, stateful models only explicitly use the input x(t), not the past inputs $x(t−1), \ldots, x(t−k)$, to forecast the output y(t) for some time point t. Instead, they maintain a hidden state h(t) of the system that is continuously updated with each new time step and thus contains information about the entire past of the time series. The output can then be predicted utilizing both the current input conditions, as well as the hidden state of the model: $\hat{y}(t)=f(x(t); h(t))$.

The two stateful models both belong to the class of recurrent neural networks (RNNs). RNNs are a powerful method for modeling time series, however they may be difficult to train since their depth increases with the length of the time series. If training is not performed carefully, this can lead to bifurcations of the gradient during the error back-propagation training procedure, which can result in a very slow convergence ("vanishing gradients problem"), if the optimization converges at all.

Echo State Networks (ESN)

Figure 7:
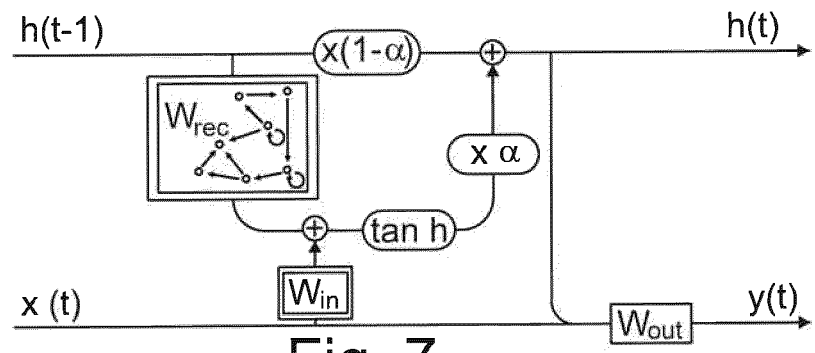
FIG. 7 shows an example of an ESN architecture.

FIG. 7 illustrates an exemplary structure of the ESN. ESNs are an alternative RNN architecture that can alleviate some of the above-mentioned training related problems of RNNs by not using error backpropagation for training at all. Instead, ESNs use very large randomly initialized weight matrices, which essentially act as a random feature expansion of the input (similar to the implicit feature map $\phi$ used in KRR), combined with a recurrent mapping of the past inputs; collectively called the "reservoir". This way, ESNs can keep track of the hidden state $h(t) \in R^m$ (with $m \gg d_x$) of the system by updating $h(t)$ at each time step to contain a weighted sum of the previous hidden state $h(t-1)$ and a combination of the randomly expanded input features $x(t)$ and randomly recurrently mapped $h(t-1)$. The final prediction of the output is then computed using LRR on the inputs and hidden state, i.e., $$\hat{y}(t) = W_{out}[x(t); h(t)] \text{ with } W_{out} \in R^{d_y \times (d_x + m)}.$$

In general, echo state networks are a very powerful type of RNN, whose performance on dynamical system forecasting is often on par with or even better than that of other, more popular and complex RNN models (LSTM, GRU, etc.). Since the only learned parameters are the weights $W_{out}$ of the linear model used for the final prediction, ESNs can also be trained on smaller datasets without risking too much overfitting.

LSTM Networks

Figure 8:
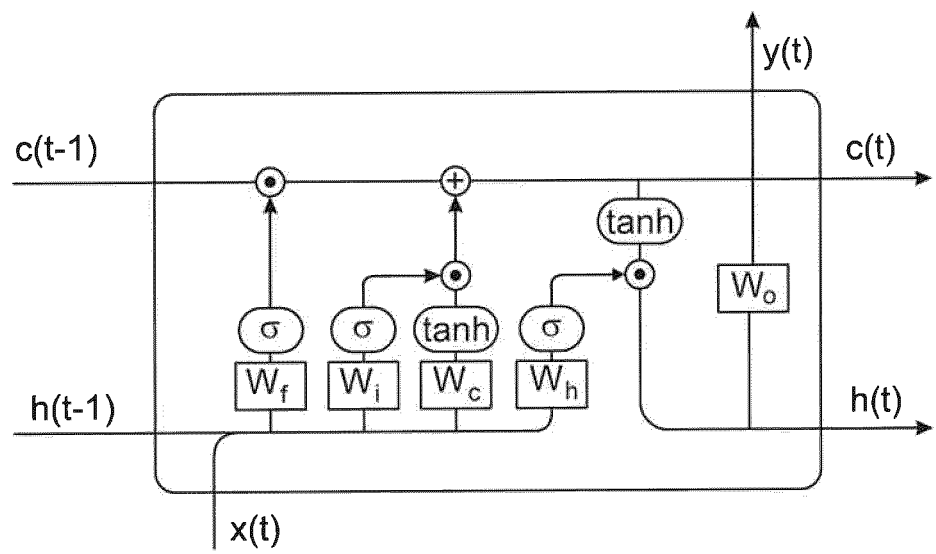
FIG. 8 shows an example of an LSTM architecture.

Another very popular architecture for dealing with the vanishing gradients problem in RNNs is the long short-term memory (LSTM) architecture, which was developed specifically for this purpose. FIG. 8 illustrates an exemplary structure of an LSTM network. LSTMs are trained using error backpropagation as usual, but avoid the problem of vanishing gradients by using an additional state vector called the "cell state", alongside the usual hidden state. This cell state is the core component of the LSTM and runs through the entire recurrent chain while being updated slowly at each time step using only linear updates, making it capable of preserving long term dependencies in the data and maintaining a stable gradient over long sequences. The inclusion of new or removal of old information to the cell state is carefully regulated by special neural network layers called gates. While the updates of the hidden state $h(t)$ of an LSTM network are much more complex compared to ESNs, the final prediction is again only a linear transformation of the network's internal hidden state:

$$\hat{y}(t) = W_o h(t) \text{ with } W_o \in R^{d_y \times m}.$$

However, in this case, the parameter values of $W_o$ are optimized together with the other parameters of the LSTM network, instead of using a separate LRR model.

Due to the multiple layers needed to model the gates that regulate the cell state, the LSTM typically requires larger amounts of training data to avoid overfitting. Though despite its complexity, the stability of the gradients of the LSTM make it very well suited for time series problems with long-term dependencies.

4.3 Variations of Stateful Models

Feedback Stateful Models

Until now we have only used the operating parameters in order to predict the key performance indicators (KPIs) of the process, however incorporating the past KPIs as input can serve as powerful new source of information, especially because of the high autocorrelation or the KPIs across time within the same cycle.

The main challenge here is that the KPIs of the previous time step are not readily available, in fact, in real world scenarios we could expect to only have a few KPI values available at the start of the cycle at best, while we would need to predict the KPIs for the rest of the duration of the cycle. Since autocorrelation quickly diminishes with time, only using these KPI values at the beginning of the cycles will not be very beneficial for any long-term prediction. However, assuming our predictions are accurate enough, we may use predicted KPIs at previous time steps as a reasonable approximation for the true KPIs. This would enable us to exploit the high temporal autocorrelation between the outputs to improve our prediction accuracy.

Figure 9:
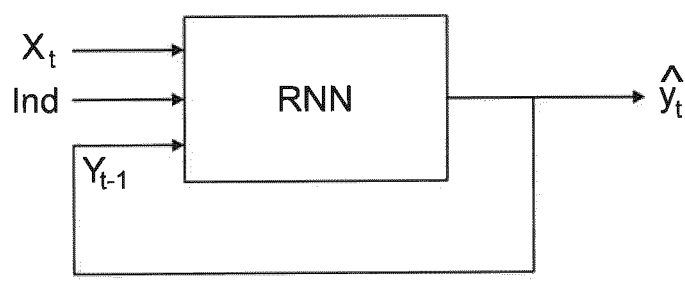
FIG. 9 shows an example of a feedback stateful model.

One way to incorporate this into a stateful model would be to include the predicted output (or true output if available) from the previous time-step into the input vector for the current time-step. For example, FIG. 9 shows an example of a feedback stateful model, showing the concatenation of the output of the previous time step to the input of the next step. In the exemplary embodiment shown in FIG. 9:

If $t < t_{start}$ then $y_{t-1} = y_{t-1}$—measured value else $y_{t-1} = \hat{y}_{t-1}$—calculated value 0 if feedback=true measured KPI 1 if feedback=prediction from RNN at the previous step However, such an implementation can easily lead to large prediction errors. The reason for this is that the predicted outputs are only approximations to the true output and thus not as reliable as the true outputs. Since the previous predicted outputs will be used for the next prediction, any small error in the value of the predicted outputs will be thus propagated into the prediction for the next output. Over longer time periods, these small errors will accumulate and can lead the prediction into vastly different direction from the true output time series, leading to very large errors. It is therefore crucial to distinguish the reliable true outputs from the unreliable predicted outputs to the network, so that the network can estimate the reliability of these two variables independently.

One way to achieve this is to include an indicator variable alongside each feedback output value, which would indicate whether this output value is a true output, i.e. an actual measured KPI from the process, or a predicted KPI, i.e. the output from the stateful model at the previous time-step. Thus, the exemplary feedback stateful model is achieved simply by appending two values to the input vector at each time-step: the output value of the previous time-step and an indicator variable that is 0 if the feedback value is a true measured KPI or 1 if the feedback value was predicted by the stateful model at the previous step. An illustration of this model in given in FIG. 6, which illustrates an example of a feedback LSTM as an example of the feedback stateful model showing the concatenation of the output of the previous time-step to the input of the next step. Preferably, the network would learn the connection between these two variables and thus learn to distinguish between the reliable true feedback values and the less reliable past LSTM predictions.

Hybrid Model

In the basic problem setting of forecasting industrial aging processes (IAPs), all of the processes considered are subject to some underlying degradation process that reduces the process efficiency over time. Since this degradation is long term and occurs across the entire cycle, it is difficult to forecast, since it is influenced by the conditions in the cycle early on, but this dependency is largely unknown and difficult to learn due to the large time lag. However, since engineers are often aware of the basic dynamics underlying the degradation process, it is possible to parametrize the degradation of the KPIs using some parametrized prototype function, whose parameters can be fitted to match the degradation curve of a given cycle perfectly. We try to exploit this knowledge in order to make the learning problem simpler for the LSTM as an example of the stateful model by separating the problem into predicting the instantaneous effects and the long-term effects of the input on the KPIs.

One way to isolate the instantaneous effects is to train a linear model without any temporal information. In our experiments, we train a LRR model as an example of the linear model only on the initial time period (e.g., first 1%-10%, preferably 1%-5%, of all observations of the cycle) of the cycles, when the effect of the degradation is still minimal, and without using the time variable as input, so the model does not try to learn from the temporal context but only the instantaneous effects of the inputs on the KPIs. While this method will only learn the linear instantaneous effects, usually this is enough to remove much of the instantaneous artifacts from the cycle so that the residuals reflect the degradation curve.

As mentioned previously, the residuals can then be modelled using a parametrized prototype function whose parameters would be fitted to each degradation curve. In this way, instead of predicting the individual values at each time point of the degradation trend, which is often highly non-stationary, one only needs to use an LSTM to predict one set of parameters per cycle, which are used in the prototype function to model the entire degradation curve. This in turn makes the learning problem more constrained, since one can only model the degradation using functions of the form given by the prototype. We expect this property to be especially useful for the real-world dataset, where the constraint enforced by the prototype function should reduce overfitting on the smaller training set.

As a final step, since the LRR only captures the instantaneous linear dependencies, and the LSTM would ideally capture the long-term degradation trend.

Two-Speed Hybrid Model

Figure 10:
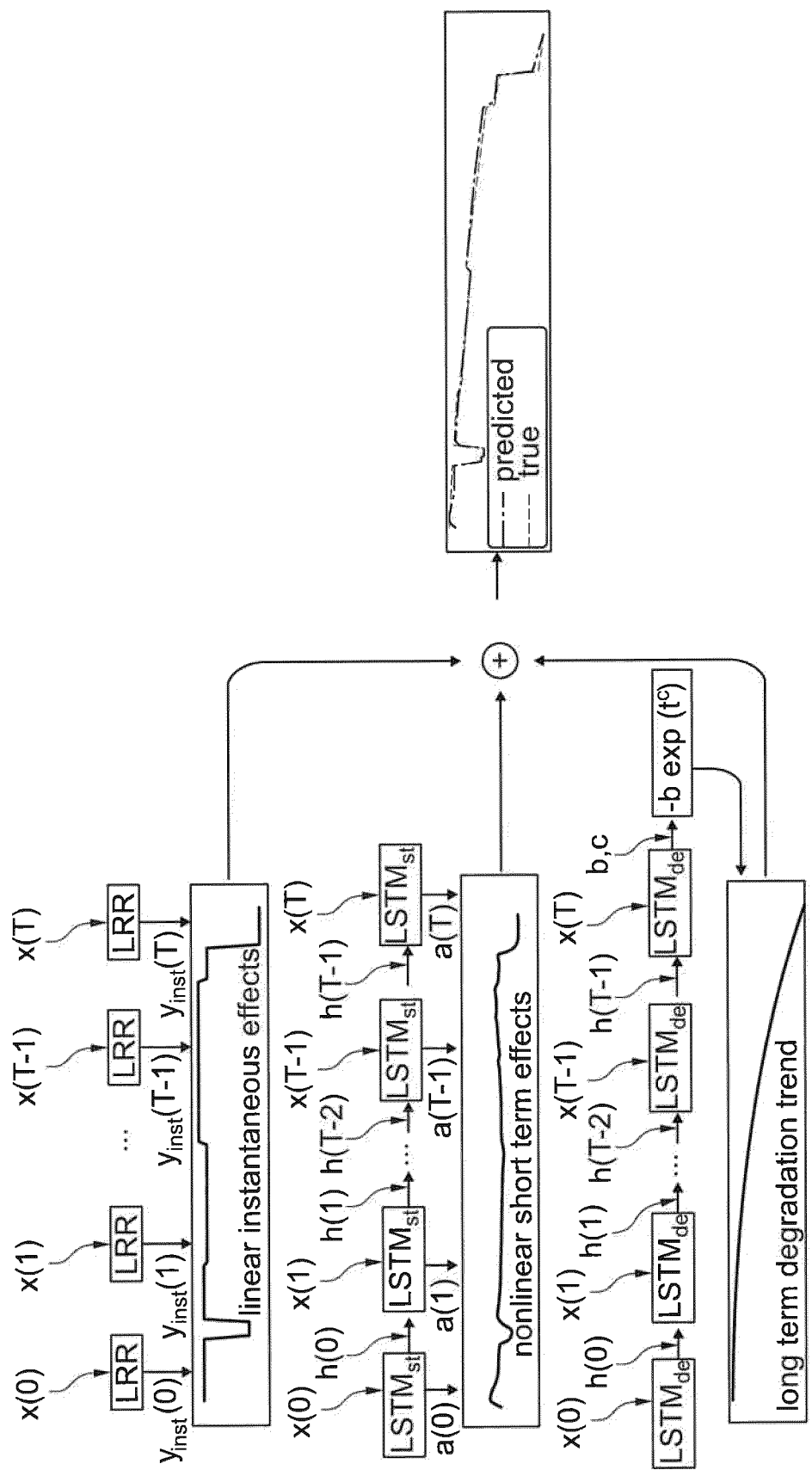
FIG. 10 shows an example of a hybrid model.

In some cases, since the prototype function may not always be a perfect fit for the degradation and there will still be some artifacts that are not linear or instantaneous and are thus not captured by the linear model, e.g., LRR, we need another stateful model, e.g, LSTM that would try to model these additional short-term artifacts separately at each time point. Because of this combination of two stateful models, one for the long term degradation and one for the short artifacts, we name this model the two-speed model, the complete scheme of which is illustrated on FIG. 10, which illustrates an overview of the two-speed hybrid model, showing three different model components (e.g., an LRR and two LSTMs) and the cycle decompositions that they learn.

5. Training Process

The data-driven model is parameterized according to a training dataset, wherein the training dataset is based on sets of historical data comprising operating data, catalyst age indicator, and the at least one target operating parameter.

For example, for the ESN models, the parameters of the reservoir matrices are not trained but randomly generated, and training occurs after the hidden state features have been generated for every time point in the training dataset. After this the final output matrix is parametrized/trained using linear ridge regression, with produces a globally optimal linear mapping that minimizes the difference between the targets and the predictions.

For the LSTM-based models, training is performed using stochastic gradient descent, where the model parameters are slowly updated using the gradient of a random subset of training samples in order to minimize some error function (in this case the difference between the predictions and targets). This procedure is repeated iteratively over many iterations, until the optimization converges at some (most probably) local minimum of the error function.

The machine learning models also have a set of hyperparameters that cannot be trained. In order to choose a good set of hyperparameters, we employ a validation set which is disjoint from the training set. The model is the instantiated with different sets of hyperparameters and trained on the training set, after which the performance is measured on the validation set. Subsequently, for each model type, we choose the hyperparameters that resulted in the best performance for that particular model on the validation set.

Finally, in order to evaluate generalization performance of the model on new unseen samples, we use a test set which is distinct from both the training and validation set.

The loss is calculated as the mean of the root mean square errors (RMSE) of all the test cycles. The predictions of both the ESN and LSTM models are independent across the different cycles, since the hidden state is newly initialized before the prediction of each new cycle.

6. Results

In this section, we report our evaluation of the seven different machine learning models introduced in Section 3 using the synthetic and real-world datasets described in Section 2. To measure the prediction errors of the machine learning models, we use the mean squared error (MSE), which, due to the subdivision of our datasets into cycles, we define slightly differently than usual: Let the dataset D be composed of N cycles, and let $y_i(t)$ denote the KPIs at time point $t \in 0, \ldots, T_i$ within the i-th cycle, where $T_i$ is the length of the i-th cycle. Then, given the corresponding model predictions $\hat{y}_i(t)$, the MSE of a model for the entire dataset is calculated as $$MSE(D) = \frac{1}{N}\sum_{i=1}^{N}\frac{1}{T_i}\sum_{t=0}^{T_i}(y_i(t) - \hat{y}_i(t))^2.$$

Since the synthetic and real-world datasets are very different, they were used to examine different aspects of the models. The synthetic dataset was used to examine how the models perform in a nearly ideal scenario, where data is freely available and the noise is very low or even non-existent. On the other hand, the real-world dataset was used to test the robustness of the models, since it contains only a limited amount of training samples and a relatively high noise level.

6.1 Synthetic Dataset

In order to systematically evaluate the performance of the different methods in a controlled environment, a synthetic dataset was generated as described in Section 2. A total of 50 years of historical data were generated, consisting of 2153 cycles for a total of 435917 time points. Roughly 10% of the cycles of the dataset were randomly selected as the out-of-sample test set, resulting in a training set consisting of 1938 cycles (391876 time points), and a test set consisting of 215 cycles (44041 time points). Only results for conversion as a degradation KPI are discussed; results for selectivity are similar.

The hyperparameters for the LRR, KRR, and ESN models were selected using a 10-fold cross-validation within the training set. The FFNN and LSTM models were trained using stochastic gradient descent, using Nesterov momentum for the parameter updates. The hyperparameters for the neural network models were determined based on the performance on a validation set consisting of a random selection of 15% of the cycles in the training set. The number of the training epochs was chosen using early stopping, with training being stopped if the validation set error had not improved in the last 6 epochs.

For the stateless models, e.g., LRR, KRR, and FFNN, the input vector at time point t consisted of the operating parameters for the past 24 hours, giving the models a time window into the past, i.e. $x_{24h}(t)=[x(t); x(t-1); \ldots; x(t-24)]$. Further increasing this time window did not yield any noticeable improvements in performance for either model. Since the stateful models are capable of encoding the past into their hidden state, the input for the ESN and LSTM at any time point t only consisted of the operating parameters at the current time point, i.e. $x(t)$. The feedback stateful model, e.g., feedback LSTMs, appending two values to the input vector at each time-step: the output value of the previous time-step and an indicator variable that is 0 if the feedback value is a true measured KPI or 1 if the feedback value was predicted by the LSTM at the previous step. The input for the hybrid model may be a combination of the input of the stateless models and the stateful models.

LRR, KRR, FFNN, ESN, and LSTM

Figure 11:
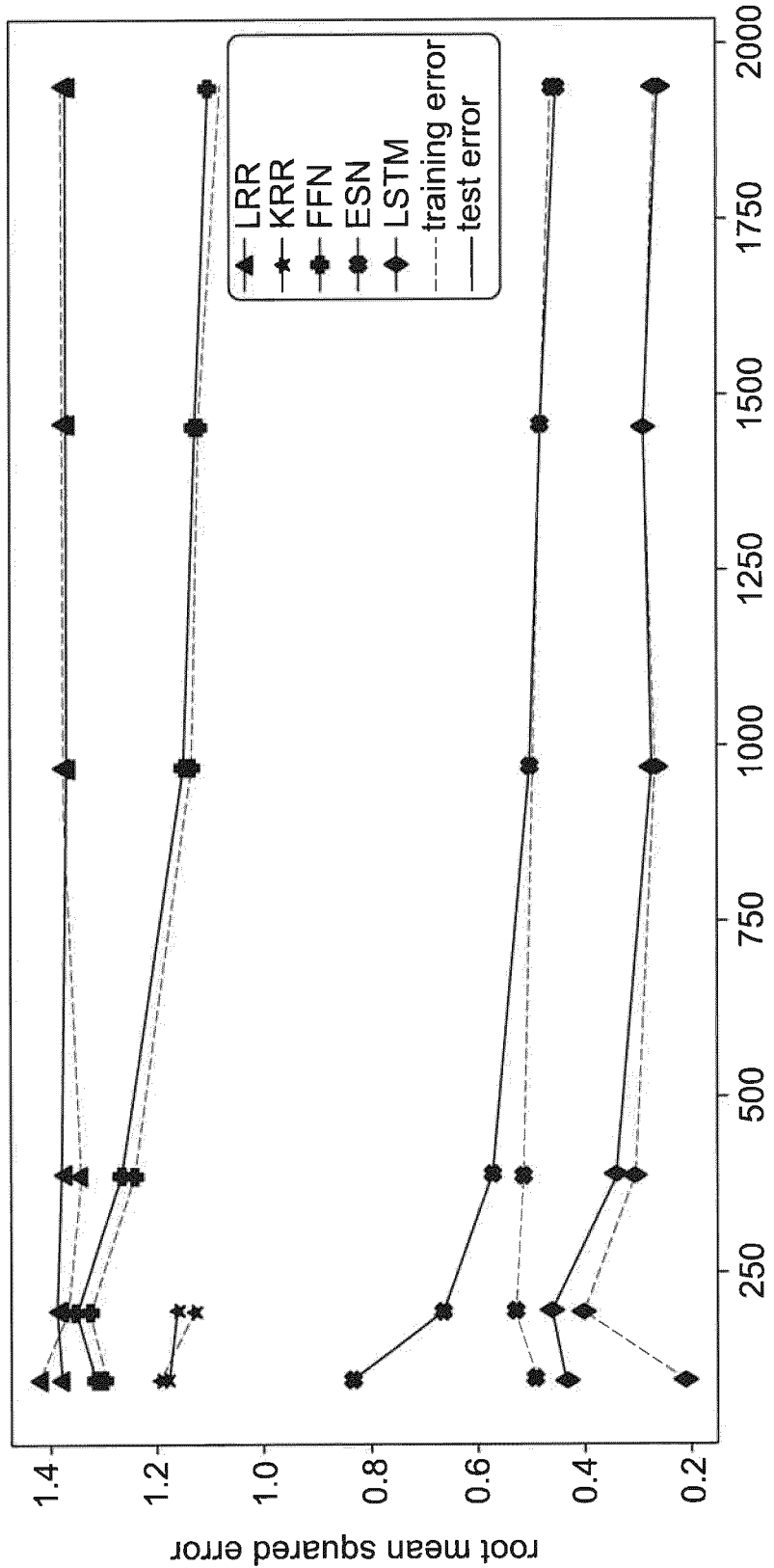
FIG. 11 shows the mean squared errors (MSE) for each of the five models (LRR, KRR, FFNN, ESN, and LSTM) on the training and test sets across different training set sizes.
Figure 12A:
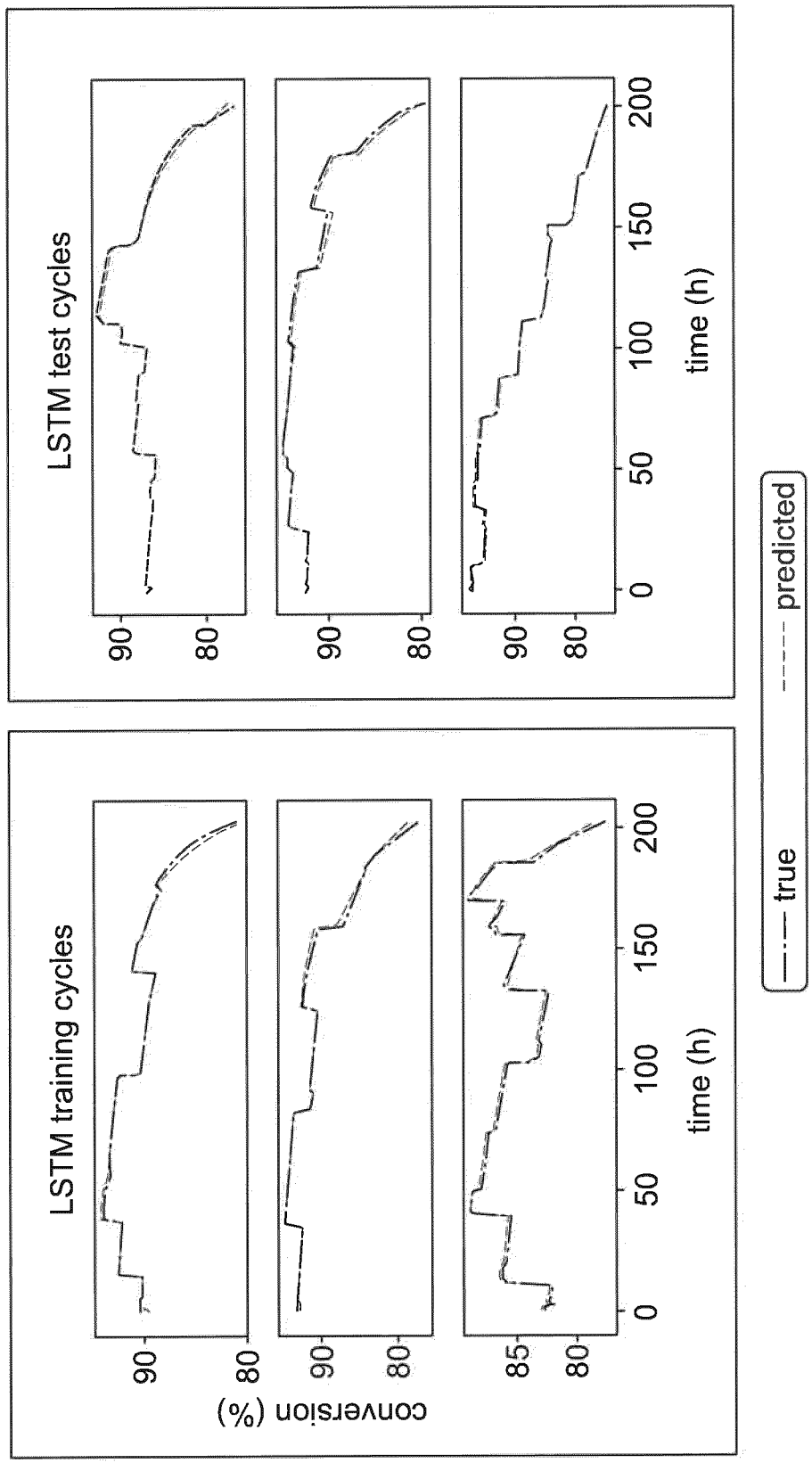
FIGS. 12A-12D show plots of the true and predicted conversion rates of the models LRR, KRR, FFNN, ESN, and LSTM for some randomly selected cycles from the training and test sets.
Figure 12B:
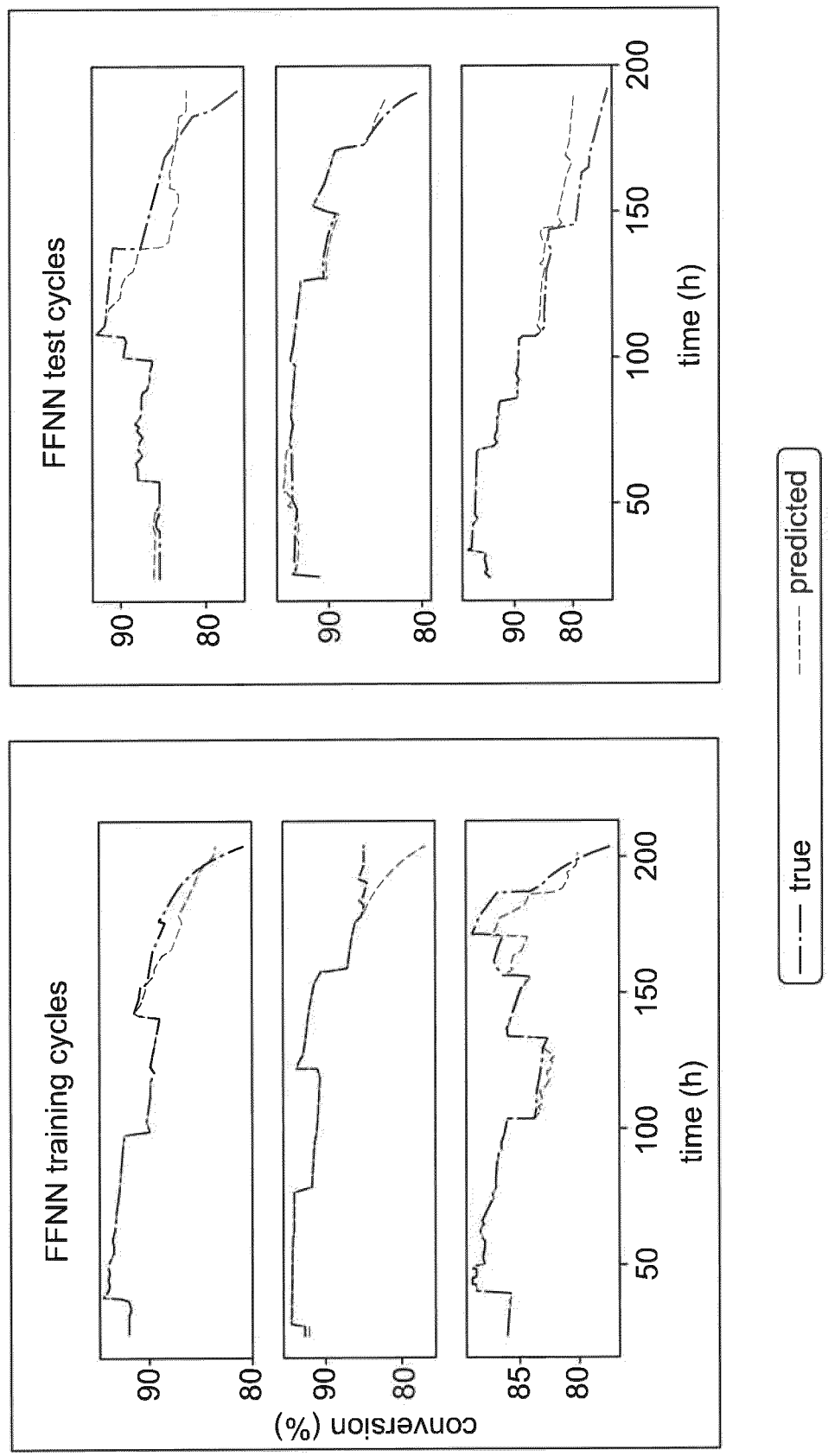
Figure 12C:
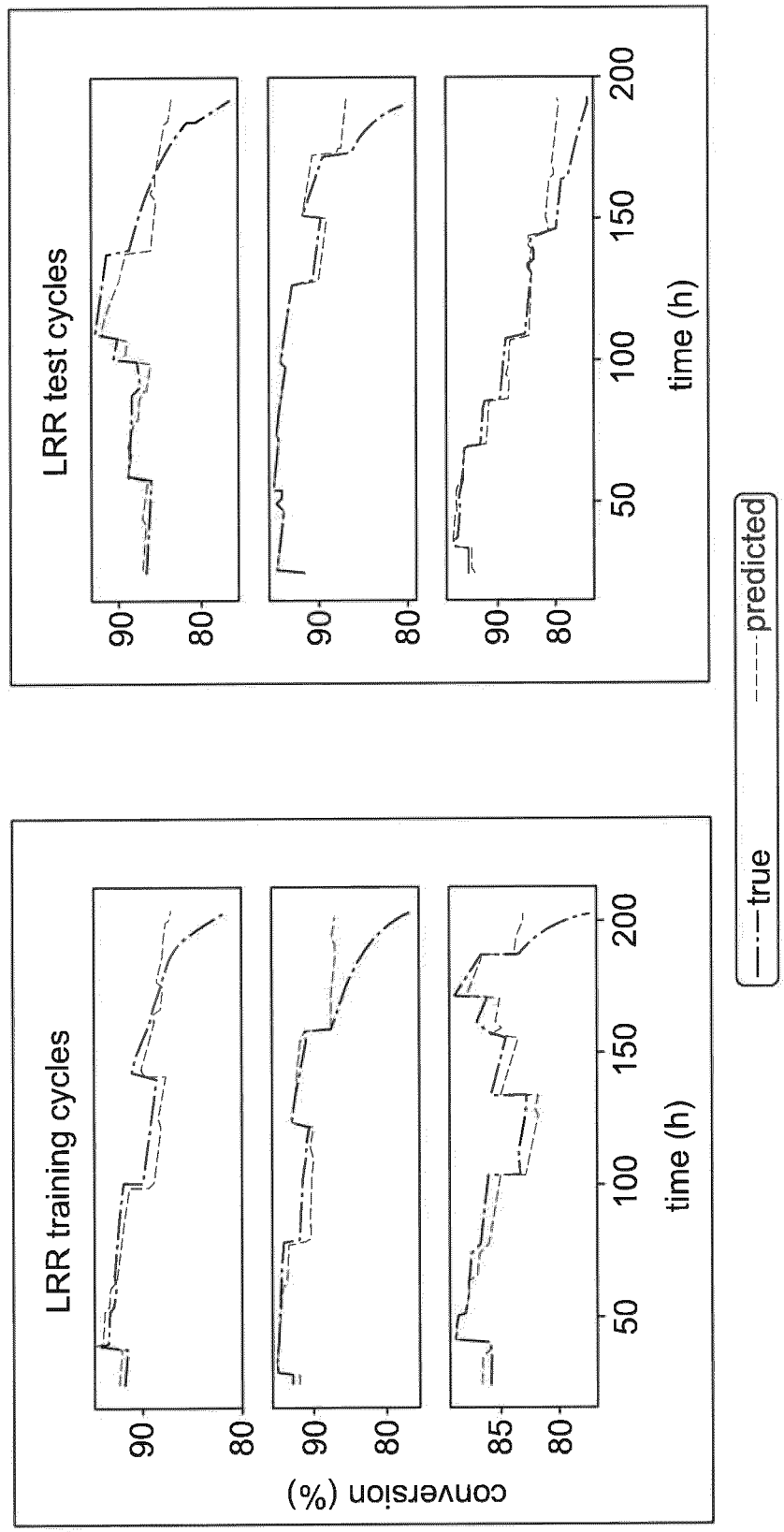
Figure 12D:
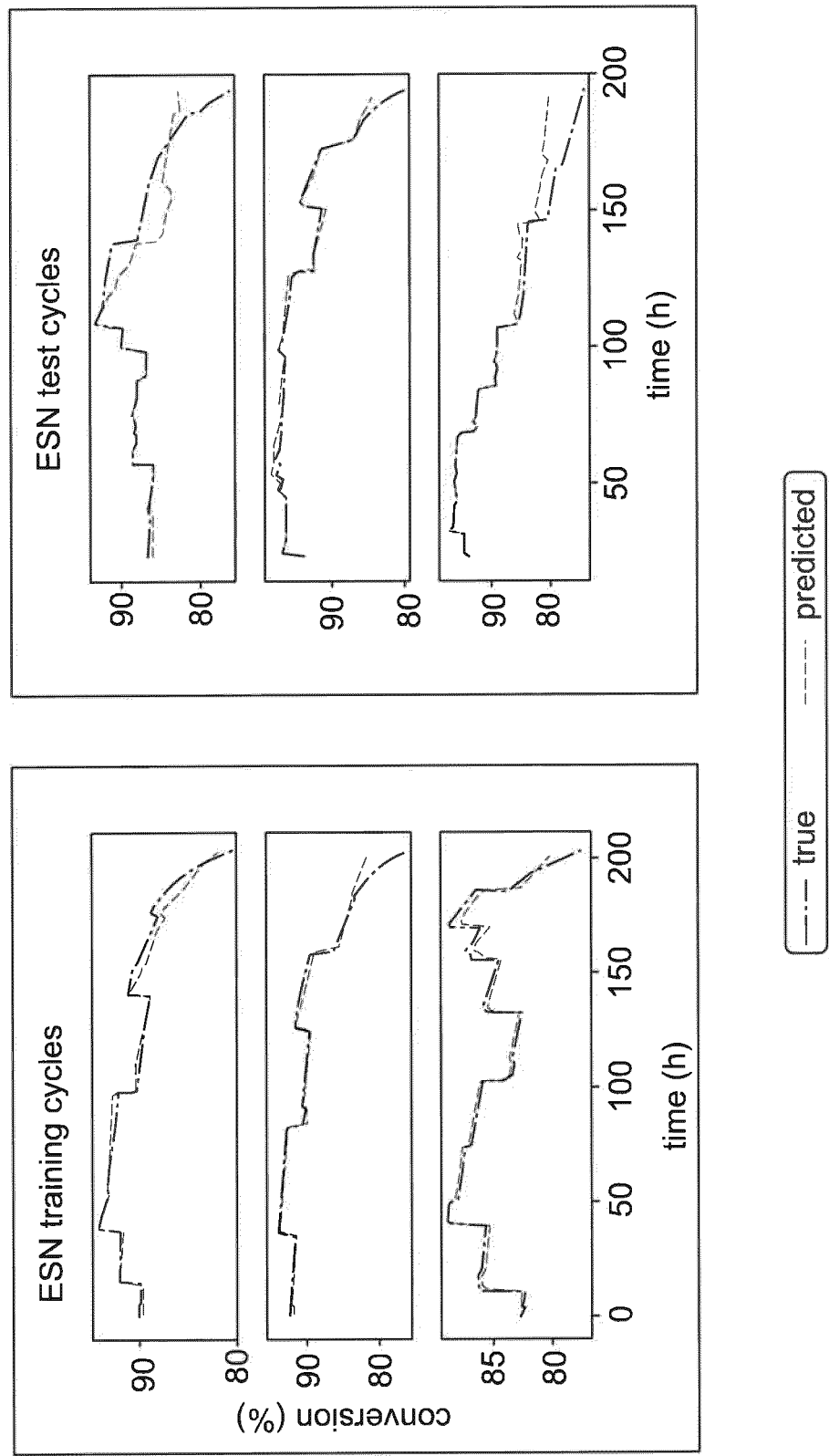

FIG. 11 shows the mean squared errors (MSE) for each of the five models on the training and test sets across different training set sizes. For most of the models, the error converges relatively early, meaning that even with a fraction of the complete dataset, the models manage to learn an accurate approximation of the dynamics of the synthetic dataset, as far as the respective model complexity permits. This also indicates that the existing errors in the models are largely due to the limitations on the flexibility of the models themselves, and not due to the training set not being large enough. This is clearly evident with LRR, which essentially achieves its maximum performance using 5% of the total dataset size. Since LRR is a linear model, it can only learn the linear relations between the inputs and outputs. While this high bias prevents the model from learning most of the non-linear dynamics regardless of the training set size, this also means that the model has low variance, i.e., it tends not to overfit on the training data. For the FFNN, the error slowly declines as the number of samples increases, though at an ever-slower rate, with the error using the full training dataset being significantly lower that LRR. As for ESN and LSTM, both methods seem to somewhat overfit for the smaller training set sizes, judging by the differences between training and test errors, however, even then the test errors are much lower compared to the three stateless models. The errors of both models converge at around 50% of the full dataset, after which there is virtually no overfitting and no significant improvement of the performance for larger dataset sizes. The general lack of overfitting can be explained by the fact that the training and test set are generated using the exact same model, i.e., they are taken from the same distribution, which is the optimal setting for any machine learning problem. Additionally, the lack of noise in the synthetic dataset also helps explain the lack of overfitting, since overfitting usually involves the model fitting the noise instead of the actual signal/patterns. Across all dataset sizes, the LSTM model is clearly the best performing, with its error when using the full dataset being 5 times smaller than the error of the ESN model.

Given the great performance of the ESN and especially the LSTM model, these experiment clearly demonstrate that even with smaller amounts of high-quality data, entire degradation cycles can in principle be predicted with very high accuracy.

FIGS. 12A-12D show plots of the true and predicted conversion rates of the different models for some randomly selected cycles from the training and test sets. These show that all the models are capable of accurately predicting the instantaneous effects of the input parameters on the output, since this relation is largely linear and not time dependent. However, where the models differ the most is in the non-linear long term degradation, where the stateless models only predict a roughly linear trend, with FFNN coming slightly closer to the actual degradation trend due to its non-linearity, while the ESN model predicts the degradation better but fails to capture the rapid decline near the end of each cycle. The LSTM model, on the other hand, manages to capture the short- and long-term effects almost perfectly, with only small errors at the very ends of the cycles where there is smaller amounts of data, due to the varying length of the cycles.

Feedback Stateful Model

The test scenario for the feedback model was that the first 12 hours of output values are known for every cycle, and can thus be used as true feedback, after which the feedback will have to be taken from the LSTMs predictions for the previous time points. So all the mean squared errors reported for the feedback model are obtained by evaluating on a test set where the first 12 hours of each cycle are given as true feedback.

Figure 13A:
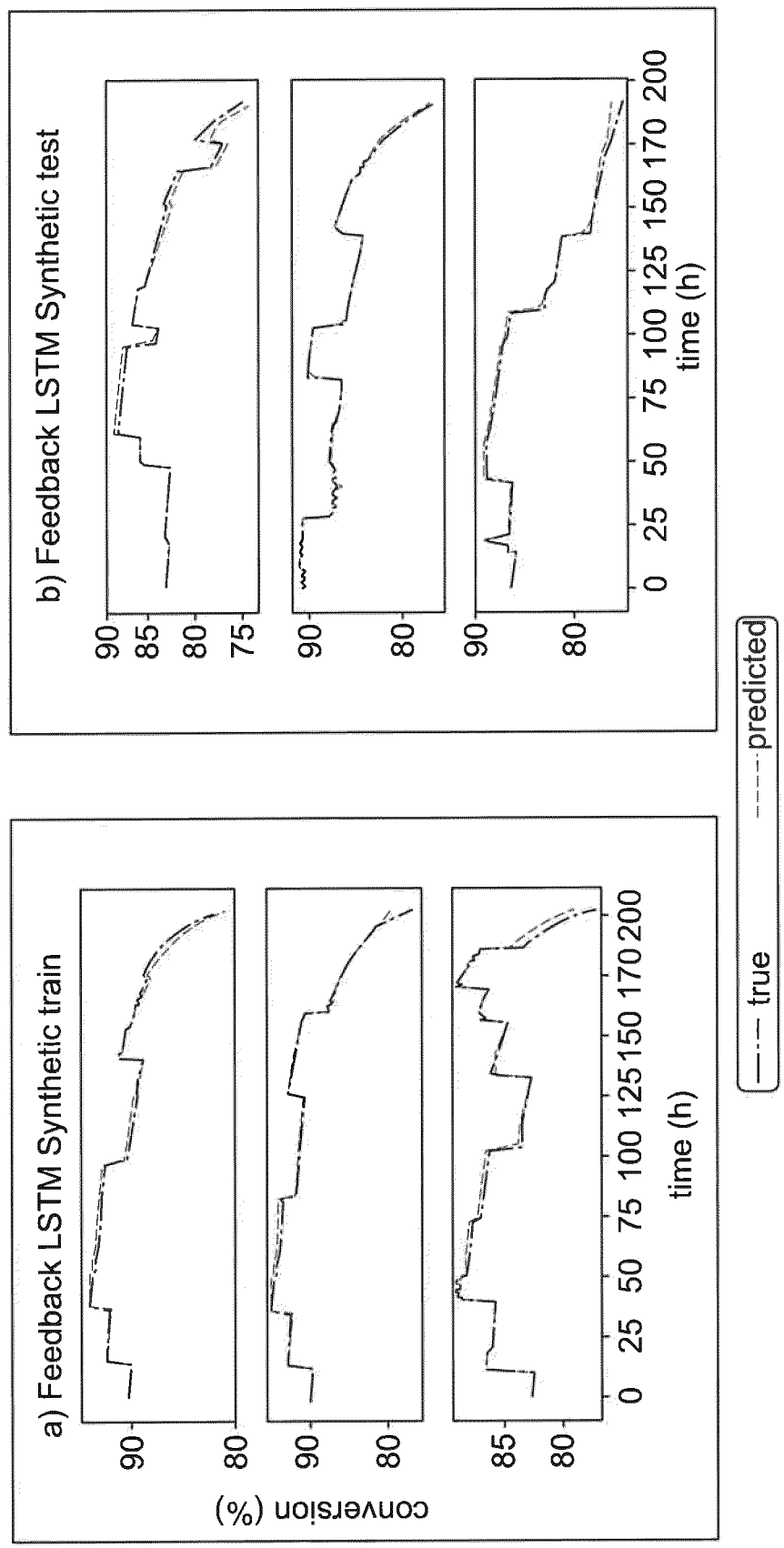
FIGS. 13A-13B show plots of the predicted and true KPIs for a feedback LSTM for randomly chosen training and test samples from both datasets.
Figure 13B:
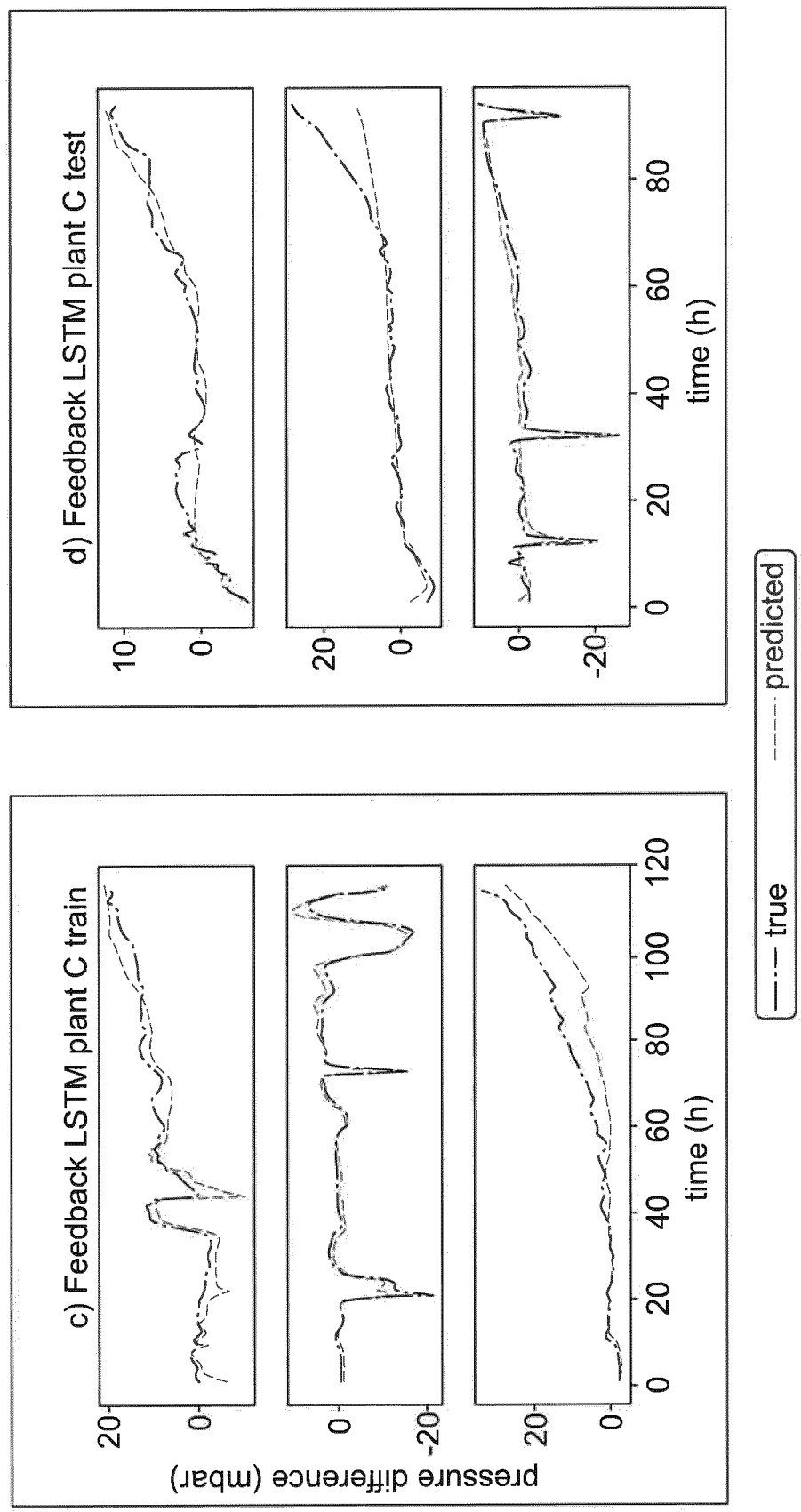

FIGS. 13A-13B shows plots of the predicted and true KPIs for an example of a feedback stateful model for randomly chosen training and test samples from both datasets, i.e., synthetic and real-world datasets in plant C.

For the synthetic dataset, the error of the feedback model after the phase-wise training procedure was used was significantly higher than the error of the regular LSTM. More accurately the regular LSTM has an MSE of 0.08, while the MSE of the feedback model was nearly 4 times larger, at 0.31 (0.32 training error).

While it is not immediately clear why the performance has suffered in this case, our assumption is that the overall high accuracy of the predictions leads to the network learning that the feedback values are also reliable when they are predicted, leading for the model to start strongly relying on the predicted feedback values for its future predictions. As mentioned previously, this leads to an accumulation of small errors in the feedback values, which may be the reason for the deteriorated performance of the feedback LSTM with respect to the regular LSTM.

Additionally, the two additional input parameters may make the learning problem more complex, thus not allowing the feedback LSTM to converge quickly to a very low local minimum, which is actually useful in this case since it reduces overfitting, which can once again lead to better performance on the test set.

Hybrid Model

For both of the synthetic and real-world datasets we used an exponential function of the form $$f_{deg}(t)=g(p_1(t),p_2(t),\ldots,p_n(t))$$

where the parameter $p_1(t)$ was predicted by one LSTM as an example of the stateful model as the short-term artifacts and the parameters $p_2(t), \ldots, p_n(t)$ were predicted by the long-term LSTM.

Figure 14A:
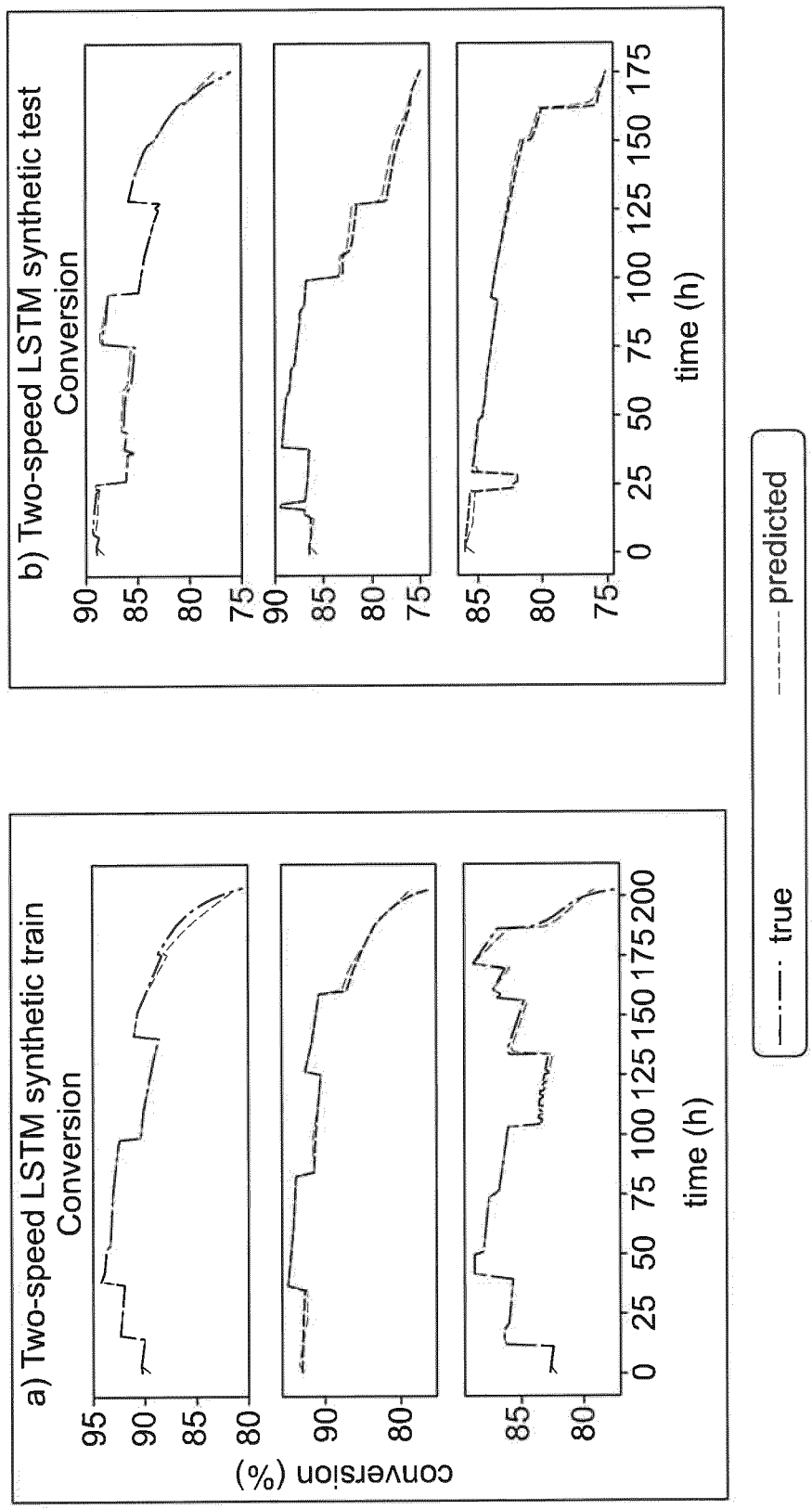
FIGS. 14A-14B show plots of the predicted and true KPIs for an example of a hybrid model for randomly chosen training and test samples from both datasets.
Figure 14B:
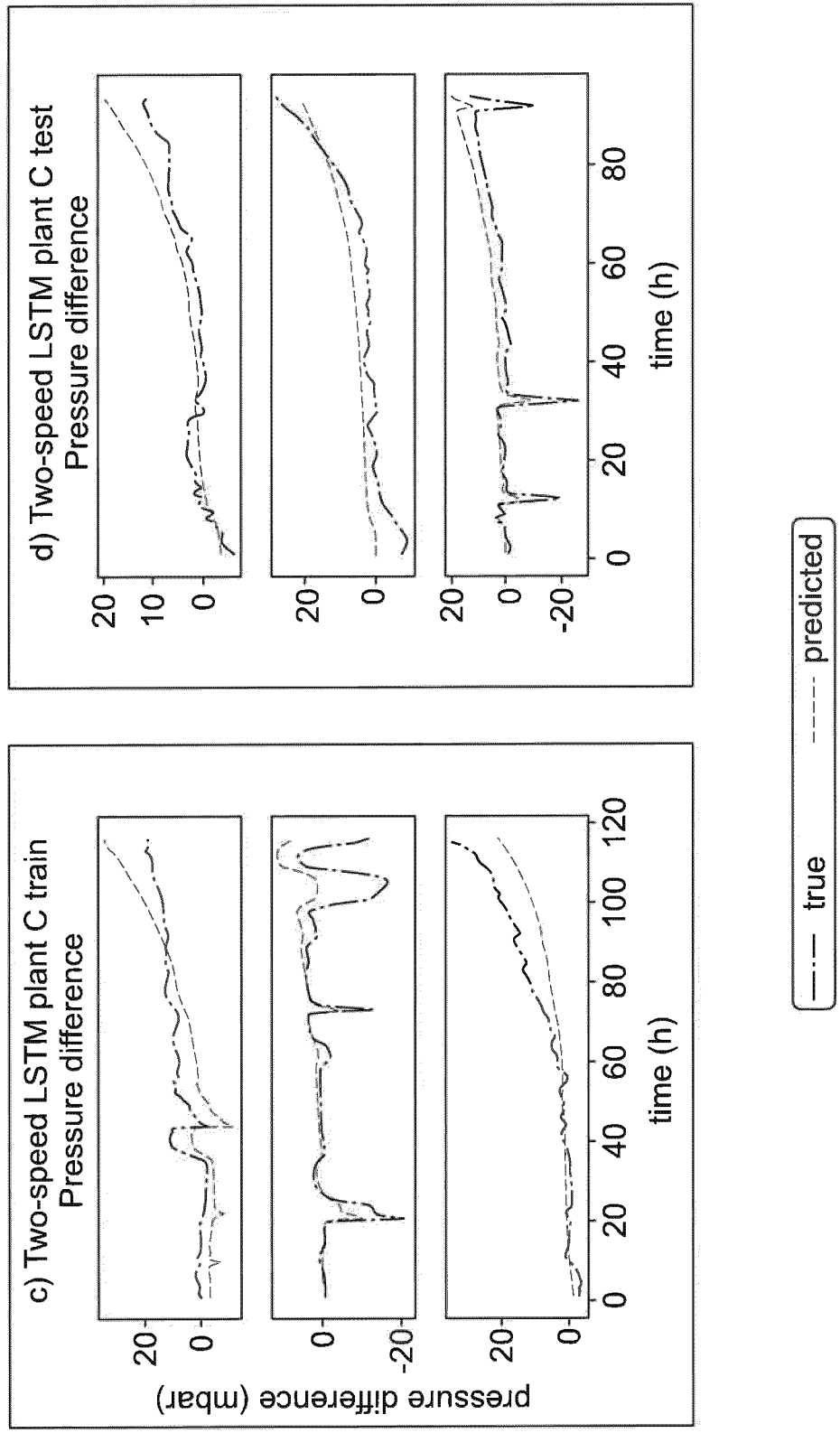

FIGS. 14A-14B shows plots of the predicted and true KPIs for an example of a hybrid model for randomly chosen training and test samples from both datasets, i.e., synthetic and real-world datasets in plant C.

For the synthetic dataset, the MSE of the two-speed model somewhat higher than the error of the regular LSTM, with the two-speed LSTM having an MSE of 0.13 (0.137 training error), while the MSE of the LSTM was 0.08. This was somewhat expected, since the constraint induced by the prototype function makes the LSTM slightly less flexible, which is detrimental for the synthetic dataset where there is a lot of data so overfitting is not a problem.

6.2 Real-World Dataset

The real-world dataset is much smaller than the synthetic, consisting of a total of 375 cycles. After removing some outlier cycles (shorter than 50 hours), the final size of the dataset is 327 cycles for a total of 36058 time points, i.e., it is more than 10 time smaller than the full synthetic dataset. As the real-world dataset stretches over 3 time periods with different catalyst charges in the reactor, we test the performance in a realistic manner by selecting the third catalyst charge as the test set, which makes it possible to see to what extent the models are able to extrapolate across the different conditions caused by the catalyst exchange. This resulted in a training set consisting of 256 cycles (28503 time points), while the test set consists of 71 cycles (7555 time points).

The hyperparameters for the real-world dataset were selected in an analogous manner to the synthetic dataset, only that due to the smaller size of the dataset, and thus shorter epochs, early stopping was triggered when the validation error had not improved in the last 30 epochs.

For this dataset, the input for both the stateful and stateless models at time point t only consisted of the process conditions at that time point x(t). Extending a time window for additional hours into the past only reduced the performance, since it reduces the size of the training set (if k hours from the past are taken, the inputs for each cycle have to start k hours later, leading to the loss of k samples per cycle) and increases the number of input features, making overfitting more likely for all models.

LRR, KRR, FFNN, ESN, LSTM

Figure 15:
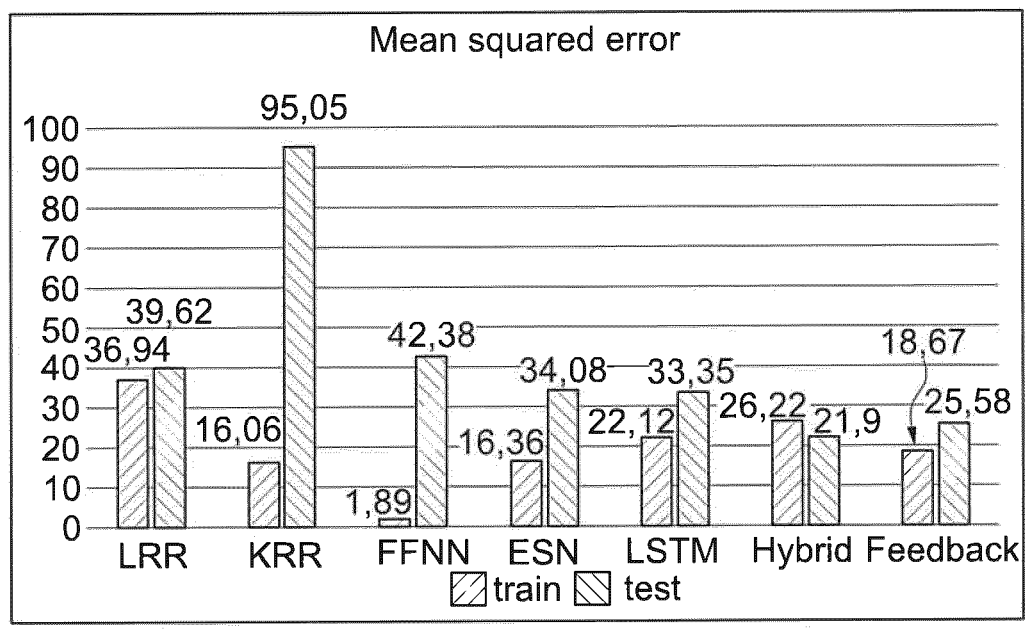
FIG. 15 shows the mean squared errors for some models on the training and test sets.

FIG. 15 shows the mean squared errors for each of the five models on the training and test sets. Due to the larger noise and the smaller amount of data, the results here are different compared to the ones for the synthetic dataset: The more complex models show more overfitting, since the test errors are significantly larger than the corresponding training errors, especially for KRR, which also has the largest test error of all models. On the other hand, LRR shows almost no overfit and its performance on the test set is much closer to that of the other models. Once again, ESNs and LSTMs outperform the stateless models, but this time, the margin is much slimmer and both models show a very similar performance. This is likely due to the larger potential for overfitting of the LSTM model here, given the larger level of noise and the smaller number of samples.

Feedback Stateful Model

For the real-world date set, i.e., plant C dataset in FIGS. 10(c) and 9(d), the error of the feedback model was 25.58 (18.67 training error), which is significantly lower than the regular LSTM with an MSE of 33.35. Here we have the opposite result compared to the synthetic dataset, which we assume is the case because of the higher noise level and overall worse accuracy of the predictions of the plant C data. This means that the correlation between the previous predicted output and the next true output is not that high, so the feedback model will not rely on these values too much when predicting the next output, but will still learn to rely on the true feedback because of the phase-wise training procedure, which is probably what leads to the improved performance.

Hybrid Model

For the real-world data set, i.e., plant C dataset in FIGS. 10(c) and 9(d), i.e. real-word dataset, the MSE of the two-speed model is at 21.9 (26.22 training error), which is significantly lower than the MSE of regular LSTM, which was 33.35. As expected, the reason for this is the constraining by the prototype function, which fits the shape of the degradation process well and reduces overfitting, which is especially useful since the plant C dataset has a much smaller training set available.

7. Use Cases

Notorious degradation phenomena in chemical plants may be predicted with the above-mentioned method, including, but not limited to:

the deactivation of heterogeneous catalysts due to coking, sintering, or poisoning;

plugging of process equipment, such as heat exchangers or pipes, on process side due to coke layer formation or polymerization;

fouling of heat exchangers on water side due to microbial or crystalline deposits;

erosion of installed equipment, such as injection nozzles or pipes, in fluidized bed reactors.

8. Summary

Formulating accurate mathematical models of industrial aging processes (IAP) is essential for predicting when critical assets need to be replaced or restored. In world-scale chemical plants such predictions can be of great economic value, as they increase plant reliability and efficiency. While mechanistic models are useful for elucidating the influencing factors of degradation processes under laboratory conditions, it is notoriously difficult to adapt them to the specific circumstances of individual plants. Data-driven machine learning methods, on the other hand, are able to learn a model and make predictions based on the historical data from a specific plant and are therefore capable of adapting effortlessly to a multitude of conditions, provided enough data is available. While simpler, especially linear prediction models have previously been studied in the context of predictive maintenance, a detailed examination of more recent and complex machine learning models, such as recurrent neural networks, was missing so far.

In the present disclosure, we address the task of predicting a KPI, which indicates the slow degradation of critical equipment, over the time frame of an entire degradation cycle, based solely on the initial process conditions and how the process will be operated in this period. To this end, we have compared a total of seven different prediction models: three stateless models, namely linear ridge regression (LRR), non-linear kernel ridge regression (KRR) and feedforward neural networks (FFNN), two recurrent neural network (RNN) based stateful models, echo state networks (ESN) and LSTMs, and variations of stateful models, namely feedback stateful models and hybrid models. To assess the importance of the amount of available historical data on the models' predictions, we have first tested them on a synthetic dataset, which contained essentially unlimited, noise-free data points. In a second step, we examined how well these results translate to real-world data from a large-scale chemical plant at BASF.

While the stateless models (LRR, KRR, and FFNN) accurately captured instantaneous changes in the KPIs resulting from changing process conditions, they may be inaccurate to pick up on the underlying trend caused by the slower degradation effects. ESN and LSTMs, on the other hand, are able to additionally correctly predict long-term changes, however at the expense of requiring a large amount of training data to do so. With more parameters to tune, the non-linear models often overfit on specific patterns observed in the training data and therefore made comparatively more mistakes on new test samples. In addition, two main variations on the basic LSTM model that were expected to improve the performance on the real world dataset: including a feedback loop that incorporates the past predicted outputs as additional inputs and separating the model into two or more different models that would predict different aspects of the output dynamics (e.g. instantaneous effects vs long term trend).

In general, all models can yield very promising predictions, which are accurate enough to improve scheduling decisions for maintenance events in production plants. The choice of the optimal model in a particular case depends on the amount of available data. For very large datasets, we found that LSTMs can yield almost perfect forecasts over long horizons. However, if only a few cycles are available for training or the data is very noisy, it can be advantageous to apply a hybrid model that may significantly improve the performance of the LSTM model by reducing overfitting especially on small data set.

While accurate predictions of IAPs will improve the production process by allowing for longer planning horizons, ensuring an economic and reliable operation of the plant, the ultimate goal is of course to gain a better understanding of and subsequently minimize the degradation effects themselves. While mechanistic and linear models are fairly straightforward to interpret, neural network models have long been shunned for their nontransparent predictions. However, this is changing thanks to novel interpretation techniques such as layer-wise relevance propagation (LRP), which make it possible to visualize the contributions of individual input dimensions to the final prediction. With such a method, the forecasts of RNNs such as LSTMs could be made more transparent, therefore shedding light on the influencing factors and production conditions contributing to the aging process under investigation, which could furthermore be used to help improve the underlying process engineering.

Figure 16:
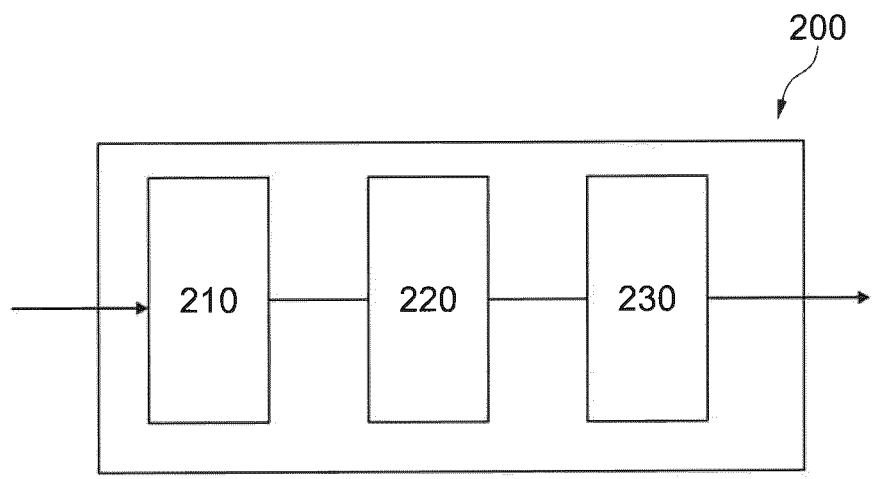
FIG. 16 schematically shows an apparatus for predicting a progress of degradation in an equipment of a chemical production plant.

FIG. 16 schematically shows an apparatus 200 for predicting a progress of degradation of a chemical production plant. The apparatus 200 comprises an input unit 210 and a processing unit 220.

The input unit 210 is configured to receive currently measured process data indicative of a current process condition for a current operation of at least one chemical process equipment of the chemical production plant. The at least one chemical process equipment is operated in a cyclic manner including multiple runs. The at least one chemical process equipment has one or more degradation key performance indicators, KPIs, for quantifying the progress of degradation of the at least one chemical process equipment. The input unit 210 is further configured to receive one or more expected operating parameters indicative of a planned process condition of the at least one chemical process equipment within a prediction horizon.

Thus, the input unit 210 may be, in an example, implemented as an Ethernet interface, a USB™ interface, a wireless interface such as a WiFi™ or Bluetooth™ or any comparable data transfer interface enabling data transfer between input peripherals and the processing unit 220.

The processing unit 220 is configured to perform any one of the above-described method steps.

Thus, the processing unit 220 may execute computer program instructions to perform various processes and methods. The processing unit 220 may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality. Furthermore, such processing unit 220 may be connected to volatile or non-volatile storage, display interfaces, communication interfaces and the like as known to a person skilled in the art.

The apparatus 200 comprises an output unit 230 for providing the future value or the one or more degradation KPIs within the prediction horizon which is usable for monitoring and/or controlling.

Thus, the output unit 230 may be in an example, implemented as an Ethernet interface, a USB™ interface, a wireless interface such as a WiFi™ or Bluetooth™ or any comparable data transfer interface enabling data transfer between output peripherals and the processing unit 230.

Figure 17:
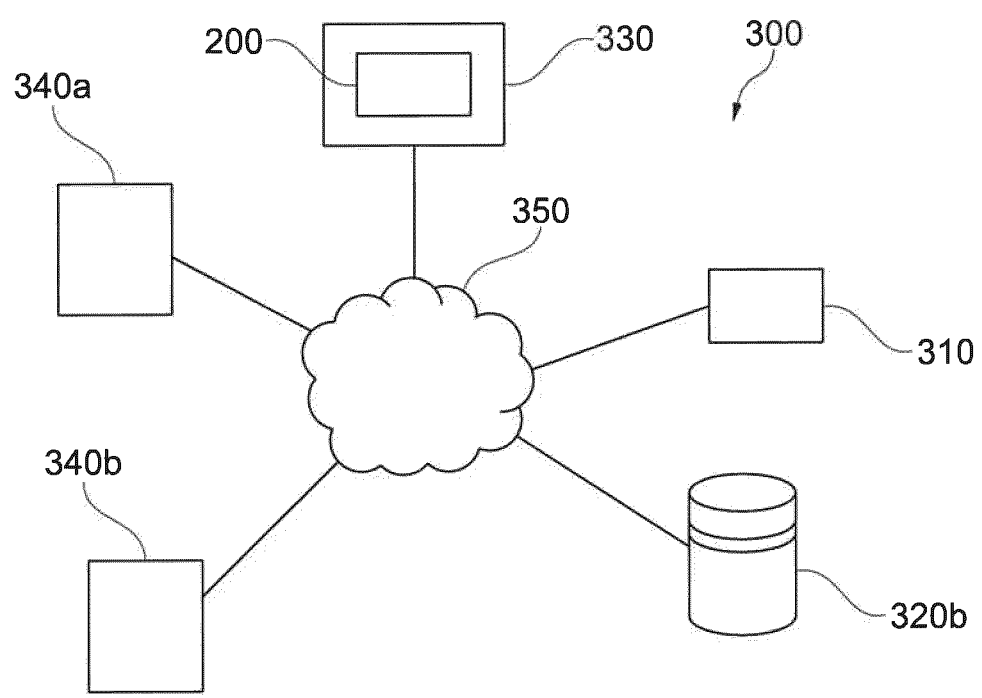
FIG. 17 schematically shows a system for predicting a progress of degradation in an equipment of a chemical production plant.

FIG. 17 schematically shows an example of a system 300 for predicting a progress of degradation of a chemical production plant. The system 300 of the illustrated example comprises a sensor system 310 comprising one or more sensors (not shown) installed in a chemical production plant, a data repository 320, a web server 330 comprising an apparatus 200 for predicting a progress of degradation of the chemical production plant as described above and below, a plurality of electronic communications device 340a, 340b, and a network 350.

The sensor system 310 may comprises one or more sensors installed in the chemical production plant, e.g., in one or more of chemical process equipment, for sensing temperature, pressure, flow rate, etc. Examples of the sensors may include, but not limited to, temperature sensors, pressure sensors, flow rate sensors, etc.

The data repository 320 may be databases that receive data produced in a production environment by the one or more sensors of the sensor system 310 and the operating parameters indicative of the process condition. For examples, the data repository 320 may collect sensor data and operating parameters from different chemical process equipment or from different chemical production plants. These chemical production plants may be in the same physical location or in different cities, states, and/or countries, which are interconnected with a network. In another example, the data repository may collect sensor data and operating parameters from different production sites, either in the same physical locations or dispersed over different physical sites. The data repository 320 of the illustrated example may be any type of database including a server, a database, a file, etc.

The web server 330 of the illustrated example may be a server that provides a web service to facilitate management of sensor data and operating parameters in the plurality of the data repository. The web server 330 may comprise an apparatus 200 for predicting a progress of degradation of the chemical production plant as describe above and below. In some embodiments, the web server 330 may interface with users e.g. via webpages, desktop apps, mobile apps to facilitate the management of sensor data, operating parameters, and the use of the apparatus to predict a progress of degradation of a chemical production plant. Alternatively, the web server 330 of the illustrated example may be replaced with another device (e.g. another electronic communication device) that provides any type of interface (e.g. a command line interface, a graphical user interface). These interfaces, such as webpages, desktop apps, mobile apps, may allow the user to manage data using the electronic communication devices 340*a*, 340*b* via the network 350. The web server 330 may also include an interface through which a user can authenticate (by providing a username and password). For example, a user account may be used for authenticating a system user of a particular chemical production plant to utilize the web server 330 to access some of the data repositories to retrieve sensor data and operating parameters of the this particular chemical plant to allow the apparatus 200 to predict a progress of degradation of this particular chemical plant.

The electronic communication devices 340*a*, 340*b* of the illustrated example may be a desktop, a notebook, a laptop, a mobile phone, a smart phone and/or a PDA. In some embodiments, the electronic communication devices 340*a*, 340*b* may also be referred to as clients. Each electronic communication device 340*a*, 340*b* may comprise a user interface configured to facilitate one or more users to submit access the web server. The user interface 12 may be an interactive interface including, but not limited to, a GUI, a character user interface and a touch screen interface. Optionally, the electronic communication device 340*a*, 340*b* of the illustrated example may comprise a storage for storing e.g., sensor data and operating parameters.

The network 350 of the illustrated example communicatively couples the sensor system 310, the data repository 320, the web server 330, and the plurality of electronic communication devices 340*a*, 340*b*. In some embodiments, the network may be the internet. Alternatively, the network 350 may be any other type and number of networks. For example, the network 350 may be implemented by several local area networks connected to a wide area network. Of course, any other configuration and topology may be utilized to implemented the network 350, including any combination of wired network, wireless networks, wide area networks, local area networks, etc.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

In accordance with an example of the invention, this application further provides the following embodiments:

Embodiment 1: A computer-implemented method for predicting a progress of degradation of a chemical production plant, comprising:
 a) receiving via an input channel currently measured process data indicative of a current process condition for a current operation of at least one chemical process equipment of the chemical production plant, wherein the at least one chemical process equipment is operated in a cyclic manner including multiple runs, wherein each run includes one production phase followed by a regeneration phase, wherein the at least one chemical process equipment has one or more degradation key performance indicators, KPIs, for quantifying the progress of degradation of the at least one chemical process equipment;
 b) receiving via the input channel one or more expected operating parameters indicative of a planned operating condition of the at least one chemical process equipment within a prediction horizon;
 c) applying by a processor a data driven model to an input dataset comprising the currently measured process data and the one or more expected operating parameters to estimate a future value of the one or more degradation KPIs within the prediction horizon, wherein the data driven model is parametrized or trained according to a training dataset, wherein the training dataset is based on sets of historical data comprising process data and the one or more degradation KPIs; and
 d) providing via an output channel the future value of the one or more degradation KPIs within the prediction horizon which is usable for monitoring and/or controlling.

Embodiment 2: According to the method in Embodiment 1,
 wherein the one or more degradation KPIs are selected from parameters comprising:
  a parameter contained in a set of measured process data; and/or
  a derived parameter representing a function of one or more parameters contained in a set of the measured process data.

Embodiment 3: According to the method in Embodiment 2, wherein the selected parameters have at least one of the following characteristics:
 trending to a higher or lower value in a substantially monotonic fashion on a time scale longer than a typical production time scale, thereby indicating an occurrence of an irreversible degradation phenomenon; and
 returning to a baseline after a regeneration phase.

Embodiment 4: According to the method in any one of the preceding Embodiments, wherein the degradation comprises at least one of:
 deactivation of heterogeneous catalysts due to coking, sintering, and/or poisoning;
 plugging of a chemical process equipment on process side due to coke layer formation and/or polymerization;
 fouling of a heat exchanger on water side due to microbial and/or crystalline deposits; and
 erosion of an installed equipment in a fluidized bed reactor.

Embodiment 5: According to the method in any one of the preceding Embodiments, wherein the data driven model comprises:
- a stateful model, which is a machine learning model with a hidden state that is continuously updated with a new time step and contains information about an entire past of time series; and/or
- a stateless model, which is a machine learning model that bases its forecast only on the inputs within a fixed time window prior to the current operation.

Embodiment 6: According to the method in Embodiment 5, wherein the stateful model comprises a recurrent neural network, RNN.

Embodiment 7: According to the method in Embodiment 6, wherein the RNN comprises at least one of:
- an echo state network, ESN; and
- a long short-term memory, LSTM, network.

Embodiment 8: According to the method in any one of the Embodiments 5 to 7,
- wherein the stateful model comprises a feedback stateful model, which includes information about a predicted output or a true output from a previous time-step into the input dataset for a current time-step;
- wherein the predicted output is one or more predicted KPIs at the previous time-step; and
- wherein the true output is one or more measured KPIs at the previous time-step.

Embodiment 9: According to the method in Embodiment 8,
- wherein the input dataset further includes an indicator variable indicating whether an output of the data driven model from the previous time-step is a predicted output or a true output.

Embodiment 10: According to the method in any one of the Embodiments 5 to 9,
- wherein step a) further comprises receiving previously measured process data indicative of a past process condition for a past operation of the at least one chemical process equipment of the chemical production plant within a predefined period prior to the current operation;
- wherein step b) further comprises receiving one or more past operating parameters indicative of the past process condition of the at least one chemical process equipment within the predefined period prior to the current operation; and
- wherein in step c), the input dataset further comprises the previously measured process data and the one or more past operating parameters.

Embodiment 11: According to the method in Embodiment 5, wherein the stateless model comprises at least one of:
- a linear ridge regression, LRR;
- a kernel ridge regression, KRR; and
- a feed-forward neural network, FFNN.

Embodiment 12: According to the method in any one of the Embodiments 5 to 11,
- wherein the data driven model is a hybrid model that comprises a stateful model for predicting a degradation trend for the one or more degradation KPIs and a stateless model for predicting an additional instantaneous influence of operating parameters on the one or more degradation KPIs;
- wherein the degradation trend represents a monotonic change of the performance of the chemical process equipment on a time scale longer than a typical production time scale; and
- wherein the additional instantaneous influence of operating parameters contains no time delay in the effect of model inputs on the one or more degradation KPIs.

Embodiment 13: According to the method in Embodiment 12, wherein the stateful model comprises a combination of mechanistical pre-information about the process which is represented by a function with a predefined structure and stateful model which estimates parameters of this function.

Embodiment 14: According to the method in Embodiment 12 or 13, wherein the stateless model comprises a linear model.

Embodiment 15: According to the method in any one of the preceding Embodiments, wherein the input dataset further comprises at least one transformed process data representing a function of one or more parameters of the currently measured process data and/or the previously measured process data.

Embodiment 16: An apparatus for predicting a progress of degradation of a chemical production plant, comprising:
- an input unit;
- a processing unit; and
- an output unit;
- wherein the input unit is configured to:
- receive currently measured process data indicative of a current process condition for a current operation of at least one chemical process equipment of the chemical production plant, wherein the at least one chemical process equipment is operated in a cyclic manner including multiple runs, wherein each run includes one production phase followed by a regeneration phase, wherein the at least one chemical process equipment has one or more degradation key performance indicators, KPIs, for quantifying the progress of degradation of the at least one chemical process equipment;
- receive one or more expected operating parameters indicative of a planned process condition of the at least one chemical process equipment within a prediction horizon;
- wherein the processing unit is configured to perform the method steps according to any one of claims 1 to 15; and
- wherein the output unit is configured to provide the future value of the one or more degradation KPIs within the prediction horizon which is usable for monitoring and/or controlling.

Embodiment 17: Computer program element for instructing an apparatus according to the Embodiment 16, which, when being executed by a processing unit, is adapted to perform the method steps of any one of the Embodiments 1 to 15.

Embodiment 18: Computer readable medium having stored the program element of the Embodiment 17.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims. In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A computer-implemented method for predicting a progress of degradation of a chemical production plant, comprising:
   a) receiving via an input interface currently measured process data indicative of a current process condition for a current operation of at least one chemical process equipment of the chemical production plant, wherein the at least one chemical process equipment has one or more degradation key performance indicators, KPIs, for quantifying the progress of degradation of the at least one chemical process equipment;
   b) receiving via the input interface one or more expected operating parameters indicative of a planned operating condition of the at least one chemical process equipment within a prediction horizon;
   c) applying by a processor a data driven model to an input dataset comprising the currently measured process data and the one or more expected operating parameters to estimate a future value of the one or more degradation KPIs within the prediction horizon, wherein the data driven model is parametrized or trained according to a training dataset, wherein the training dataset is based on sets of historical data comprising process data and the one or more degradation KPIs; and
   d) providing via an output interface the future value of the one or more degradation KPIs within the prediction horizon which is usable for monitoring and/or controlling,
   wherein the degradation comprises at least one of:
      deactivation of heterogeneous catalysts due to coking, sintering, and/or poisoning;
      plugging of a chemical process equipment on process side due to coke layer formation and/or polymerization;
      fouling of a heat exchanger on water side due to microbial and/or crystalline deposits; and
      erosion of an installed equipment in a fluidized bed reactor.

2. The method according to claim 1,
   wherein the at least one chemical process equipment is operated in a cyclic manner including multiple runs, wherein each run includes one production phase followed by a regeneration phase; and
   wherein the input dataset comprises at least one process information from last run.

3. The method according to claim 1,
   wherein the one or more degradation KPIs are selected from parameters comprising:
   a parameter contained in a set of measured process data; and/or
   a derived parameter representing a function of one or more parameters contained in a set of the measured process data.

4. The method according to claim 1,
   wherein the selected parameters have at least one of the following characteristics:
      trending to a higher or lower value in a substantially monotonic fashion on a time scale longer than a typical production time scale, thereby indicating an occurrence of an irreversible degradation phenomenon; and
      returning to a baseline after a regeneration phase.

5. The method according to claim 1,
   wherein the data driven model comprises:
   a stateful model, which is a machine learning model with a hidden state that is continuously updated with a new time step and contains information about an entire past of time series; and/or
   a stateless model, which is a machine learning model that bases its forecast only on the inputs within a fixed time window prior to the current operation.

6. The method according to claim 5,
   wherein the stateful model comprises a recurrent neural network, RNN.

7. The method according to claim 6,
   wherein the RNN comprises at least one of:
   an echo state network, ESN; and
   a long short-term memory, LSTM, network.

8. The method according to claim 5,
   wherein the stateful model comprises a feedback stateful model, which includes information about a predicted output or a true output from a previous time-step into the input dataset for a current time-step;
   wherein the predicted output is one or more predicted KPIs at the previous time-step; and
   wherein the true output is one or more measured KPIs at the previous time-step.

9. The method according to claim 8,
   wherein the input dataset further includes an indicator variable indicating whether an output of the data driven model from the previous time-step is a predicted output or a true output.

10. The method according to claim 5,
    wherein step a) further comprises receiving previously measured process data indicative of a past process condition for a past operation of the at least one chemical process equipment of the chemical production plant within a predefined period prior to the current operation;
    wherein step b) further comprises receiving one or more past operating parameters indicative of the past process condition of the at least one chemical process equipment within the predefined period prior to the current operation; and
    wherein in step c), the input dataset further comprises the previously measured process data and the one or more past operating parameters.

11. The method according to claim 5,
    wherein the stateless model comprises at least one of:
    a linear ridge regression, LRR;
    a kernel ridge regression, KRR; and
    a feed-forward neural network, FFNN.

12. The method according to claim 5,
    wherein the data driven model is a hybrid model that comprises a stateful model for predicting a degradation trend for the one or more degradation KPIs and a stateless model for predicting an additional instantaneous influence of operating parameters on the one or more degradation KPIs;

wherein the degradation trend represents a monotonic change of the performance of the chemical process equipment on a time scale longer than a typical production time scale; and wherein the additional instantaneous influence of operating parameters contains no time delay in the effect of model inputs on the one or more degradation KPIs.

13. The method according to claim 12, wherein the stateful model comprises a combination of mechanistical pre-information about the process which is represented by a function with a predefined structure and stateful model which estimates parameters of this function.

14. The method according to claim 12, wherein the stateless model comprises a linear model.

15. The method according to claim 1, wherein the input dataset further comprises at least one transformed process data representing a function of one or more parameters of the currently measured process data and/or the previously measured process data.

16. An apparatus for predicting a progress of degradation of a chemical production plant, comprising:
an input interface;
a processor; and
an output interface;
wherein the input interface is configured to:
receive currently measured process data indicative of a current process condition for a current operation of at least one chemical process equipment of the chemical production plant, wherein the at least one chemical process equipment is operated in a cyclic manner including multiple runs, wherein each run includes one production phase followed by a regeneration phase, wherein the at least one chemical process equipment has one or more degradation key performance indicators, KPIs, for quantifying the progress of degradation of the at least one chemical process equipment;
receive one or more expected operating parameters indicative of a planned process condition of the at least one chemical process equipment within a prediction horizon;
wherein the processor is configured to perform the method steps according to claim 1; and
wherein the output interface is configured to provide the future value of the one or more degradation KPIs within the prediction horizon which is usable for monitoring and/or controlling.

17. A non-transitory computer readable medium containing computer instructions stored therein for causing a computer processor to perform the steps according to claim 1.

* * * * *